(12) United States Patent
Cullinane et al.

(10) Patent No.: US 10,222,121 B2
(45) Date of Patent: Mar. 5, 2019

(54) CRYOGENIC SYSTEM FOR REMOVING ACID GASES FROM A HYDROCARBON GAS STREAM

(71) Applicants: John Tim Cullinane, Montgomery, TX (US); Paul Scott Northrop, Spring, TX (US)

(72) Inventors: John Tim Cullinane, Montgomery, TX (US); Paul Scott Northrop, Spring, TX (US)

(73) Assignee: ExxonMobil Upstream Research Company, Spring, TX (US)

( * ) Notice: Subject to any disclaimer, the term of this patent is extended or adjusted under 35 U.S.C. 154(b) by 719 days.

(21) Appl. No.: 14/828,951

(22) Filed: Aug. 18, 2015

(65) Prior Publication Data

US 2016/0040930 A1    Feb. 11, 2016

Related U.S. Application Data

(62) Division of application No. 13/387,615, filed as application No. PCT/US2010/042927 on Jul. 22, 2010, now abandoned.

(Continued)

(51) Int. Cl.
*F25J 3/08* (2006.01)
*F25J 3/06* (2006.01)
(Continued)

(52) U.S. Cl.
CPC .................. *F25J 3/08* (2013.01); *B01D 7/02* (2013.01); *C10L 3/10* (2013.01); *C10L 3/102* (2013.01);
(Continued)

(58) Field of Classification Search
CPC ........ F25J 3/0266; F25J 3/067; F25J 2205/10; F25J 2205/20; F25J 2205/40; F25J 2205/84
See application file for complete search history.

(56) References Cited

U.S. PATENT DOCUMENTS 2,621,216 A    12/1952   White ...................... 260/683.3
2,843,219 A    7/1958    Habgood ................... 183/114.2
(Continued)

FOREIGN PATENT DOCUMENTS

CA    1246993      12/1968    ............. E21B 43/28
CA    2515581      7/2011     ................ C02F 1/56
(Continued)

OTHER PUBLICATIONS

Aaron, D. et al. (2005) "Separation of $CO_2$ from Flue Gas: A Review,", *Separation Science and Technology*, 40, pp. 321-348.
(Continued)

*Primary Examiner* — Tareq Alosh
(74) *Attorney, Agent, or Firm* — ExxonMobil Upstream Research Company Law Department

(57) ABSTRACT

A system for removing acid gases from a raw gas stream is provided. The system includes a cryogenic distillation tower. The cryogenic distillation tower has a controlled freezing zone that receives a cold liquid spray comprised primarily of methane. The tower receives and then separates the raw gas stream into an overhead methane gas stream and a substantially solid material comprised on carbon dioxide. The system includes a collector tray below the controlled freezing zone. The collector tray receives the substantially solid material as it is precipitated in the controlled freezing zone. The system also has a filter. The filter receives the substantially solid material and then separates it into a solid material comprised primarily of carbon dioxide, and a liquid material comprising methane. The solid material may be warmed as a liquid and sold, while the liquid material is returned to the cryogenic distillation tower.

11 Claims, 7 Drawing Sheets

Related U.S. Application Data

(60) Provisional application No. 61/240,850, filed on Sep. 9, 2009.

(51) Int. Cl.
*B01D 7/02* (2006.01)
*C10L 3/10* (2006.01)
*F25J 3/02* (2006.01)

(52) U.S. Cl.
CPC .......... *F25J 3/0209* (2013.01); *F25J 3/0233* (2013.01); *F25J 3/0266* (2013.01); *F25J 3/0295* (2013.01); *F25J 3/067* (2013.01); *F25J 2200/02* (2013.01); *F25J 2200/74* (2013.01); *F25J 2200/90* (2013.01); *F25J 2200/92* (2013.01); *F25J 2200/94* (2013.01); *F25J 2205/04* (2013.01); *F25J 2205/10* (2013.01); *F25J 2205/20* (2013.01); *F25J 2205/40* (2013.01); *F25J 2205/84* (2013.01); *F25J 2210/04* (2013.01); *F25J 2215/04* (2013.01); *F25J 2220/66* (2013.01); *F25J 2260/80* (2013.01); *F25J 2270/90* (2013.01); *F25J 2280/40* (2013.01); *Y02C 10/12* (2013.01)

(56) References Cited

U.S. PATENT DOCUMENTS

| | | | |
|---|---|---|---|
| 2,863,527 A | 12/1958 | Herbert et al. | 183/115 |
| 3,050,950 A | 8/1962 | Karwal et al. | 62/13 |
| 3,109,726 A | 11/1963 | Karwat | 62/13 |
| 3,393,527 A | 7/1968 | Swensen et al. | 62/16 |
| 3,400,512 A | 9/1968 | McKay | 55/69 |
| 3,421,984 A | 1/1969 | Jensen et al. | 203/41 |
| 3,705,625 A | 12/1972 | Whitten et al. | 166/252 |
| 3,767,766 A | 10/1973 | Tjoa et al. | 423/220 |
| 3,895,101 A | 7/1975 | Tsuruta | 423/574 |
| 3,929,635 A | 12/1975 | Buriks et al. | 210/54 |
| 3,933,001 A | 1/1976 | Muska | 62/47 |
| 4,246,015 A | 1/1981 | Styring | 62/12 |
| 4,270,937 A | 6/1981 | Adler | 62/17 |
| 4,280,559 A | 7/1981 | Best | 166/303 |
| 4,281,518 A | 8/1981 | Muller et al. | 62/12 |
| 4,318,723 A | 3/1982 | Holmes et al. | 62/20 |
| 4,319,964 A | 3/1982 | Katz et al. | 202/172 |
| 4,336,233 A | 6/1982 | Appl et al. | 423/228 |
| 4,344,485 A | 8/1982 | Butler | 166/271 |
| 4,370,156 A | 1/1983 | Goddin et al. | 62/17 |
| 4,383,841 A | 5/1983 | Ryan et al. | 62/17 |
| 4,405,585 A | 9/1983 | Sartori et al. | 423/228 |
| 4,417,449 A | 11/1983 | Hegarty et al. | 62/26 |
| 4,417,909 A | 11/1983 | Weltmer, Jr. | 62/12 |
| 4,421,535 A | 12/1983 | Mehra | 62/17 |
| 4,441,900 A | 4/1984 | Swallow | 62/29 |
| 4,459,142 A | 7/1984 | Goddin | 62/17 |
| 4,462,814 A | 7/1984 | Holmes et al. | 62/17 |
| 4,511,382 A | 4/1985 | Valencia et al. | 62/20 |
| 4,512,782 A | 4/1985 | Bauer et al. | 55/48 |
| 4,533,372 A | 8/1985 | Valencia et al. | 62/12 |
| 4,551,158 A | 11/1985 | Wagner et al. | 55/46 |
| 4,563,202 A | 1/1986 | Yao et al. | 62/17 |
| 4,592,766 A | 6/1986 | Kumman et al. | 62/18 |
| 4,602,477 A | 7/1986 | Lucadamo | 62/24 |
| 4,609,388 A | 9/1986 | Adler et al. | 62/12 |
| 4,636,334 A | 1/1987 | Skinner et al. | 252/377 |
| 4,695,672 A | 9/1987 | Bunting | 585/867 |
| 4,717,408 A | 1/1988 | Hopewell | 62/20 |
| 4,720,294 A | 1/1988 | Lucadamo et al. | 62/31 |
| 4,747,858 A | 5/1988 | Gottier | 62/17 |
| 4,761,167 A | 8/1988 | Nicholas et al. | 62/17 |
| 4,762,543 A | 8/1988 | Pantermuehl et al. | 62/28 |
| 4,769,054 A | 9/1988 | Steigman | 62/12 |
| 4,822,393 A | 4/1989 | Markbreiter et al. | 62/17 |
| 4,831,206 A | 5/1989 | Zarchy | 585/737 |
| 4,923,493 A | 5/1990 | Valencia et al. | 62/13 |
| 4,927,498 A | 5/1990 | Rushmere | 162/168.3 |
| 4,935,043 A | 6/1990 | Blanc et al. | 62/20 |
| 4,954,220 A | 9/1990 | Rushmere | 162/168.3 |
| 4,976,849 A | 12/1990 | Soldati | 208/351 |
| 5,011,521 A | 4/1991 | Gottier | 62/11 |
| 5,062,270 A | 11/1991 | Haut et al. | 62/12 |
| 5,120,338 A | 6/1992 | Potts et al. | 62/12 |
| 5,137,550 A | 8/1992 | Hegarty et al. | 55/43 |
| 5,152,927 A | 10/1992 | Rivers | 252/344 |
| 5,233,837 A | 8/1993 | Callahan | 62/38 |
| 5,247,087 A | 9/1993 | Rivers | 544/357 |
| 5,265,428 A | 11/1993 | Valencia et al. | 62/36 |
| 5,335,504 A | 8/1994 | Durr et al. | 62/20 |
| 5,345,771 A | 9/1994 | Dinsmore | 62/16 |
| 5,620,144 A | 4/1997 | Strock et al. | 239/557 |
| 5,643,460 A | 7/1997 | Marble et al. | 210/705 |
| 5,700,311 A | 12/1997 | Spencer | 95/236 |
| 5,720,929 A | 2/1998 | Minkkinen et al. | 422/190 |
| 5,819,555 A | 10/1998 | Engdahl | 62/637 |
| 5,820,837 A | 10/1998 | Marjanovich et al. | 423/220 |
| 5,899,274 A | 5/1999 | Frauenfeld et al. | 165/401 |
| 5,956,971 A | 9/1999 | Cole et al. | 62/623 |
| 5,964,985 A | 10/1999 | Wootten | 201/40 |
| 5,983,663 A | 11/1999 | Sterner | 62/620 |
| 6,053,007 A | 4/2000 | Victory et al. | 62/619 |
| 6,082,133 A | 7/2000 | Barclay et al. | 62/619 |
| 6,082,373 A | 7/2000 | Sakurai et al. | 134/1 |
| 6,162,262 A | 12/2000 | Minkkinen et al. | 23/295 |
| 6,223,557 B1 | 5/2001 | Cole | 62/613 |
| 6,240,744 B1 | 6/2001 | Agrawal et al. | 62/643 |
| 6,274,112 B1 | 8/2001 | Moffett et al. | 423/338 |
| 6,336,334 B1 | 1/2002 | Minkkinen et al. | 62/123 |
| 6,374,634 B2 | 4/2002 | Gallarda et al. | 62/620 |
| 6,401,486 B1 | 6/2002 | Lee et al. | 62/630 |
| 6,416,729 B1 | 7/2002 | DeBerry et al. | 423/573.1 |
| 6,442,969 B1 | 9/2002 | Rojey et al. | 62/618 |
| 6,500,982 B1 | 12/2002 | Hale et al. | 562/600 |
| 6,505,683 B2 | 1/2003 | Minkkinen et al. | 166/266 |
| 6,516,631 B1 | 2/2003 | Trebble | 62/630 |
| 6,517,801 B2 | 2/2003 | Watson et al. | 423/574.1 |
| 6,539,747 B2 | 4/2003 | Minta et al. | 62/620 |
| 6,565,629 B1 | 5/2003 | Hayashida et al. | 95/211 |
| 6,605,138 B2 | 8/2003 | Frondorf | 95/160 |
| 6,631,626 B1 | 10/2003 | Hahn | 62/612 |
| 6,632,266 B2 | 10/2003 | Thomas et al. | 95/49 |
| 6,662,872 B2 | 12/2003 | Gutek et al. | 166/272.4 |
| 6,708,759 B2 | 3/2004 | Leaute et al. | 166/272.4 |
| 6,711,914 B2 | 3/2004 | Lecomte | 62/625 |
| 6,735,979 B2 | 5/2004 | Lecomte et al. | 62/611 |
| 6,755,251 B2 | 6/2004 | Thomas et al. | 166/265 |
| 6,818,194 B2 | 11/2004 | DeBerry et al. | 423/228 |
| 6,946,017 B2 | 9/2005 | Leppin et al. | 95/139 |
| 6,958,111 B2 | 10/2005 | Rust et al. | 202/158 |
| 6,962,061 B2 | 11/2005 | Wilding et al. | 62/613 |
| 7,001,490 B2 | 2/2006 | Wostbrock et al. | 203/1 |
| 7,004,985 B2 | 2/2006 | Wallace et al. | 48/198.3 |
| 7,066,986 B2 | 6/2006 | Haben et al. | 95/99 |
| 7,073,348 B2 | 7/2006 | Clodic et al. | 62/532 |
| 7,121,115 B2 | 10/2006 | Lemaire et al. | 62/625 |
| 7,128,150 B2 | 10/2006 | Thomas et al. | 166/256 |
| 7,128,276 B2 | 10/2006 | Nilsen et al. | 236/124 |
| 7,152,431 B2 | 12/2006 | Amin et al. | 62/637 |
| 7,211,701 B2 | 5/2007 | Muller et al. | 568/853 |
| 7,219,512 B1 | 5/2007 | Wilding et al. | 62/617 |
| 7,325,415 B2 | 2/2008 | Amin et al. | 62/541 |
| 7,424,808 B2 | 9/2008 | Mak | 62/625 |
| 7,437,889 B2 | 10/2008 | Roberts et al. | 62/619 |
| 7,442,231 B2 | 10/2008 | Landrum | 95/45 |
| 7,442,233 B2 | 10/2008 | Mitariten | 95/123 |
| 7,493,779 B2 | 2/2009 | Amin | 62/617 |
| 7,550,064 B2 | 6/2009 | Bassler et al. | 203/29 |
| 7,575,624 B2 | 8/2009 | Cartwright et al. | 95/51 |
| 7,637,987 B2 | 12/2009 | Mak | 95/160 |
| 7,662,215 B2 | 2/2010 | Sparling et al. | 95/172 |
| 7,691,239 B2 | 4/2010 | Kister et al. | 203/2 |
| 7,722,289 B2 | 5/2010 | Leone et al. | 405/53 |
| 7,879,135 B2 | 2/2011 | Ravikumar et al. | 95/11 |
| 8,002,498 B2 | 8/2011 | Leone et al. | 405/53 |
| 8,020,408 B2 | 9/2011 | Howard et al. | 62/646 |

(56) References Cited

U.S. PATENT DOCUMENTS

| | | | | |
|---|---|---|---|---|
| 8,303,685 | B2 | 11/2012 | Schubert et al. | 95/181 |
| 8,308,849 | B2 | 11/2012 | Gal | 95/187 |
| 2002/0174687 | A1 | 11/2002 | Cai | 65/158 |
| 2002/0189443 | A1 | 12/2002 | McGuire | 95/32 |
| 2003/0181772 | A1 | 9/2003 | Meyer et al. | 585/324 |
| 2003/0192343 | A1 | 10/2003 | Wilding et al. | 62/613 |
| 2004/0116756 | A1 | 6/2004 | Kulprathipanja et al. | 585/24 |
| 2006/0065119 | A1 | 3/2006 | Landrum | 95/92 |
| 2006/0110300 | A1 | 5/2006 | Mak | 422/190 |
| 2006/0144079 | A1 | 7/2006 | Amin | 62/532 |
| 2006/0179878 | A1 | 8/2006 | Nohlen | 62/617 |
| 2006/0207946 | A1 | 9/2006 | McColl et al. | 210/733 |
| 2006/0239879 | A1 | 10/2006 | Lallemand et al. | 423/210 |
| 2007/0006729 | A1 | 1/2007 | Mitariten | 95/92 |
| 2007/0017250 | A1* | 1/2007 | Turner | F25J 1/0204 62/613 |
| 2007/0056317 | A1 | 3/2007 | Amin et al. | 62/532 |
| 2007/0144943 | A1 | 6/2007 | Lemaire et al. | 208/208 |
| 2007/0157662 | A1 | 7/2007 | Roberts et al. | 62/620 |
| 2007/0221575 | A1 | 9/2007 | Copeland et al. | 210/636 |
| 2007/0277674 | A1 | 12/2007 | Hirano et al. | 95/290 |
| 2008/0034789 | A1 | 2/2008 | Fieler et al. | 62/623 |
| 2008/0134718 | A1 | 6/2008 | Howard et al. | 62/643 |
| 2008/0209807 | A1 | 9/2008 | Tsangaris et al. | 48/89 |
| 2008/0282884 | A1 | 11/2008 | Kelley et al. | 95/96 |
| 2008/0307827 | A1 | 12/2008 | Hino et al. | 62/634 |
| 2009/0023605 | A1 | 1/2009 | Lebl et al. | 506/27 |
| 2009/0071648 | A1 | 3/2009 | Hagen et al. | 166/272.1 |
| 2009/0220406 | A1 | 9/2009 | Rahman | 423/437.1 |
| 2009/0261017 | A1 | 10/2009 | Iqbal et al. | 208/128 |
| 2009/0266107 | A1* | 10/2009 | Singh | B01D 3/14 62/617 |
| 2010/0018248 | A1 | 1/2010 | Fieler et al. | 62/617 |
| 2010/0024472 | A1 | 2/2010 | Amin et al. | 62/541 |
| 2010/0107687 | A1 | 5/2010 | Andrian et al. | 62/620 |
| 2010/0126910 | A1 | 5/2010 | Moffett et al. | 208/390 |
| 2010/0132405 | A1 | 6/2010 | Nilsen | 62/611 |
| 2010/0187181 | A1 | 7/2010 | Sortwell | 210/726 |

FOREIGN PATENT DOCUMENTS

| | | | | |
|---|---|---|---|---|
| DE | 3149847 | | 7/1983 | B01D 5/00 |
| EP | 133208 | | 2/1985 | B01D 53/14 |
| EP | 506244 | | 10/1992 | B01D 53/34 |
| EP | 1323698 | | 7/2003 | C07C 29/38 |
| EP | 1336557 | | 3/2005 | C01B 17/04 |
| GB | 2221977 | | 2/1990 | F25J 3/02 |
| WO | WO2002/032536 | | 4/2002 | B01F 13/00 |
| WO | WO2002/039038 | | 5/2002 | F25J 3/06 |
| WO | WO2003/062725 | | 7/2003 | F25J 3/08 |
| WO | WO2004/009204 | | 1/2004 | B01D 3/32 |
| WO | WO2004/020118 | | 3/2004 | B08B 9/00 |
| WO | WO2004/047956 | | 6/2004 | B01D 53/14 |
| WO | WO2004/070297 | | 8/2004 | F25J 3/06 |
| WO | WO2006/022885 | | 3/2006 | B01D 53/14 |
| WO | WO2007/030888 | | 3/2007 | F25J 3/08 |
| WO | WO2008/002592 | | 1/2008 | F25J 3/08 |
| WO | WO2008/034789 | | 3/2008 | G10K 11/00 |
| WO | WO2008/091316 | | 7/2008 | F25J 3/00 |
| WO | WO2008/091317 | | 7/2008 | F25D 25/00 |
| WO | WO2008/095258 | | 8/2008 | F25J 3/02 |
| WO | WO2008/107581 | | 9/2008 | F02D 41/02 |
| WO | WO2008/152030 | | 12/2008 | B01D 53/00 |
| WO | WO2009/023605 | | 2/2009 | C10G 21/00 |
| WO | WO2009/027491 | | 3/2009 | B01D 53/52 |
| WO | WO2009/029353 | | 3/2009 | E21B 43/00 |
| WO | WO2009/084945 | | 7/2009 | B01D 47/10 |
| WO | WO2009/087206 | | 7/2009 | B01D 53/00 |
| WO | WO2010/003894 | | 1/2010 | F25J 3/06 |
| WO | WO2010/006934 | | 1/2010 | F25J 3/02 |
| WO | WO2010/023238 | | 3/2010 | F25J 3/06 |
| WO | WO2010/034627 | | 4/2010 | F25J 3/06 |
| WO | WO2010/044956 | | 4/2010 | B01D 53/14 |
| WO | WO2010/052299 | | 5/2010 | B01D 53/00 |
| WO | WO2010/079175 | | 7/2010 | F25J 3/06 |
| WO | WO2010/079177 | | 7/2010 | F25J 3/06 |
| WO | WO2010/136442 | | 12/2010 | B01D 53/00 |
| WO | WO2011/026170 | | 3/2011 | C10L 3/10 |
| WO | WO2011/140117 | | 11/2011 | B01D 53/00 |

OTHER PUBLICATIONS

Amin, R. (2003) "Advanced Mini Natural Gas Liquefier," *LNG Journal*, Mar.-Apr. 2003, pp. 20-23.

Ciulla, Vincent (2007) "How the Engine Works," About.com, Mar. 21, 2007, [retrieved from the internet on Aug. 17, 2012], <URL: http://autorepair.about.com/cs/generalinfo/a/aa060500a.html>.

"Cryogenics", *Science Clarified*, May 2, 2006 [retrieved from the internet on Aug. 17, 2012]. <URL: http://www.scienceclarified.com/Co-Dl/Cryogenics.html>.

Denton, R. D. et al. (1985) "Integrated Low Temperature Processing of Sour Natural Gas," *Gas Processors Assoc., 64th Ann. Conv.*, pp. 92-96.

Guccione, E. (1963) "New Approach to Recovery of Helium from Natural Gas," *Chem. Engr.*, Sep. 30, 1963, pp. 76-78.

Hassan, S. M. N. (2005) "Techno-Economic Study of $CO_2$ Capture Process for Cement Plants," *University of Waterloo—Thesis*.

Haut, R. C. et al. (1988) "Development and Application of the Controlled Freeze Zone Process," *OSEA 88197, 7th Offshore So. East Asia Conf.*, Singapore, Feb. 1988, pp. 840-848.

Haut, R. C. et al. (1989) "Development and Application of the Controlled Freeze Zone Process," *SPE Production Engineering*, Aug. 1989, pp. 265-271.

Mitaritan, M. et al. (2007) "The Sorbead™ Quick-Cycle Process for Simultaneous Removal of Water, Heavy Hydrocarbons and Mercaptans from Natural Gas," *Laurance Reid Gas Conditioning Conf.*, Feb. 25-27, 2007.

Northrop, P. Scott et al. (2004) "Cryogenic Sour Gas Process Attractive for Acid Gas Injection Applications," *83rd Ann. Gas Processors Assoc. Convention*, New Orleans, LA.

Pagcatipuna, C. et al. (2005) "Maximize the Performance of Spray Nozzle Systems," *CEP Magazine*, Dec. 2005, pp. 38-44.

Thomas, E. R. et al. (1987) "Conceptual Studies Using the Controlled Freeze Zone (CFZ) Process," *AIChE Summer Nat'l Mtg.*, Aug. 16-19, 1987.

Thomas, E. R. et al. (1988) "Conceptual Studies for $CO_2$/Natural Gas Separation Using the Control Freeze Zone (CFZ) Process," *Gas Separation and Purification*, v. 2, pp. 84-89.

Victory, D. J. et al. (1987) "The CFZ Process: Direct Methane-Carbon Dioxide Fractionation" *66th Ann. GPA Convention*, Mar. 16-18, Denver, CO.

Valencia, J. A. et al. (2008) "Controlled Freeze Zone™ Technology for Enabling Processing of High $CO_2$ and $H_2S$ Gas Reserves," *SPE-IPTC 12708*, Kuala Lumpur, IN, v.4.1, Jan. 2008, pp. 2358-2363.

Wilson, R.W. et al. (1968) "Helium: Its Extraction and Purification," *Journ. Petrol. Tech.*, v. 20, pp. 341-344.

Haut, R. C. et al. (1988) "Development and Application of the Controlled Freeze Zone Process," *SPE 17757*, Dallas, TX, pp. 435-443.

PCT International Search and Written Opinion, dated Mar. 29, 2011, 12 pgs.

Reyes, S. C. et al. (1997) "Frequency Modulation Methods for Diffusion and Adsorption Measurements in Porous Solids" *J. Phys. Chem. B*, v. 101, pp. 614-622.

* cited by examiner

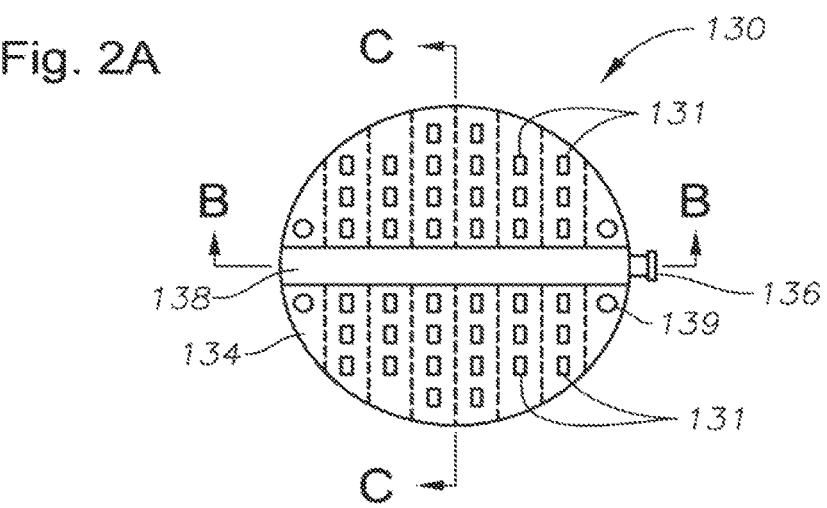
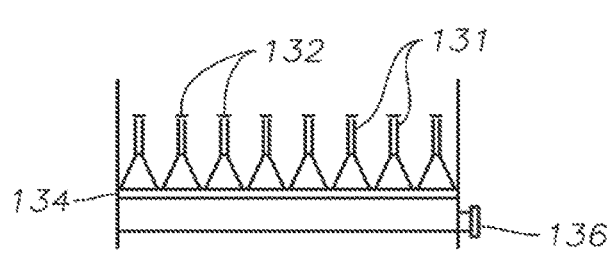
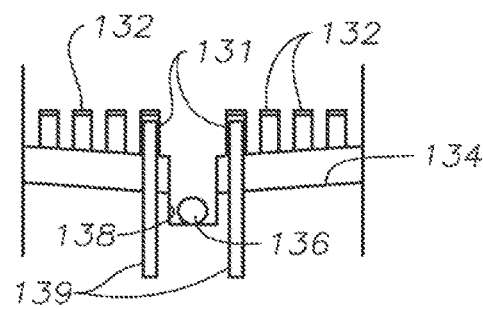
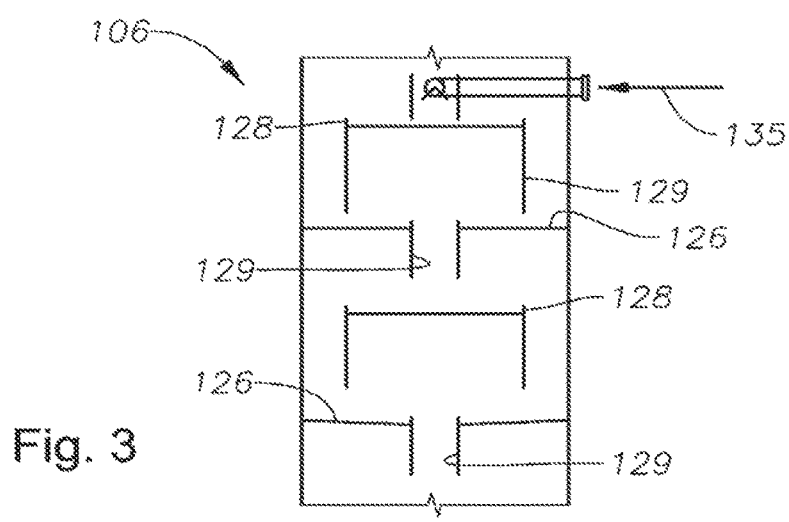

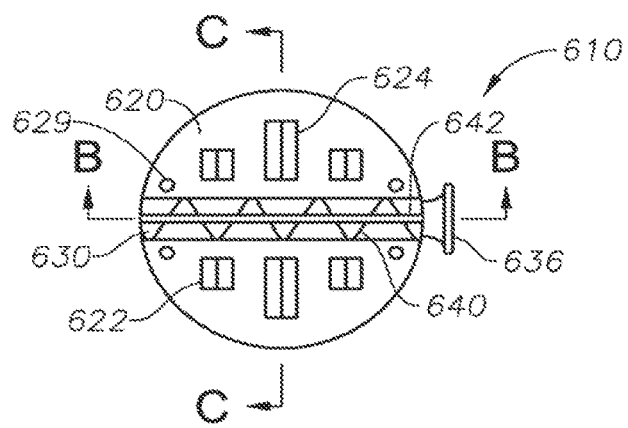
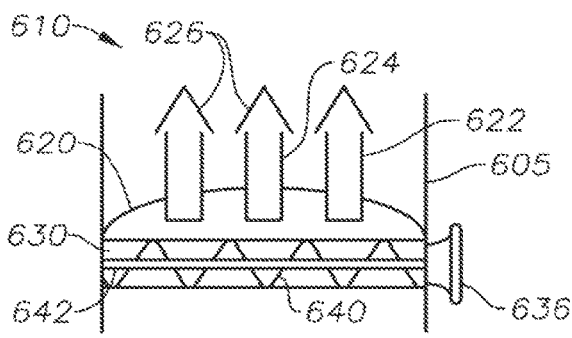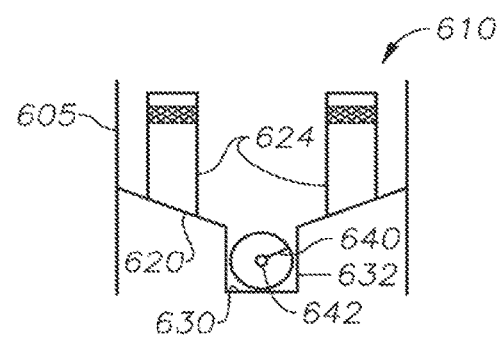
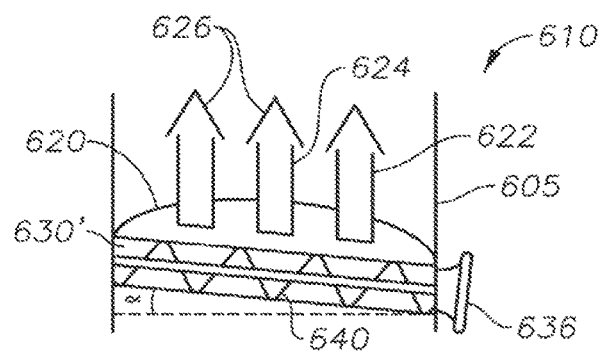

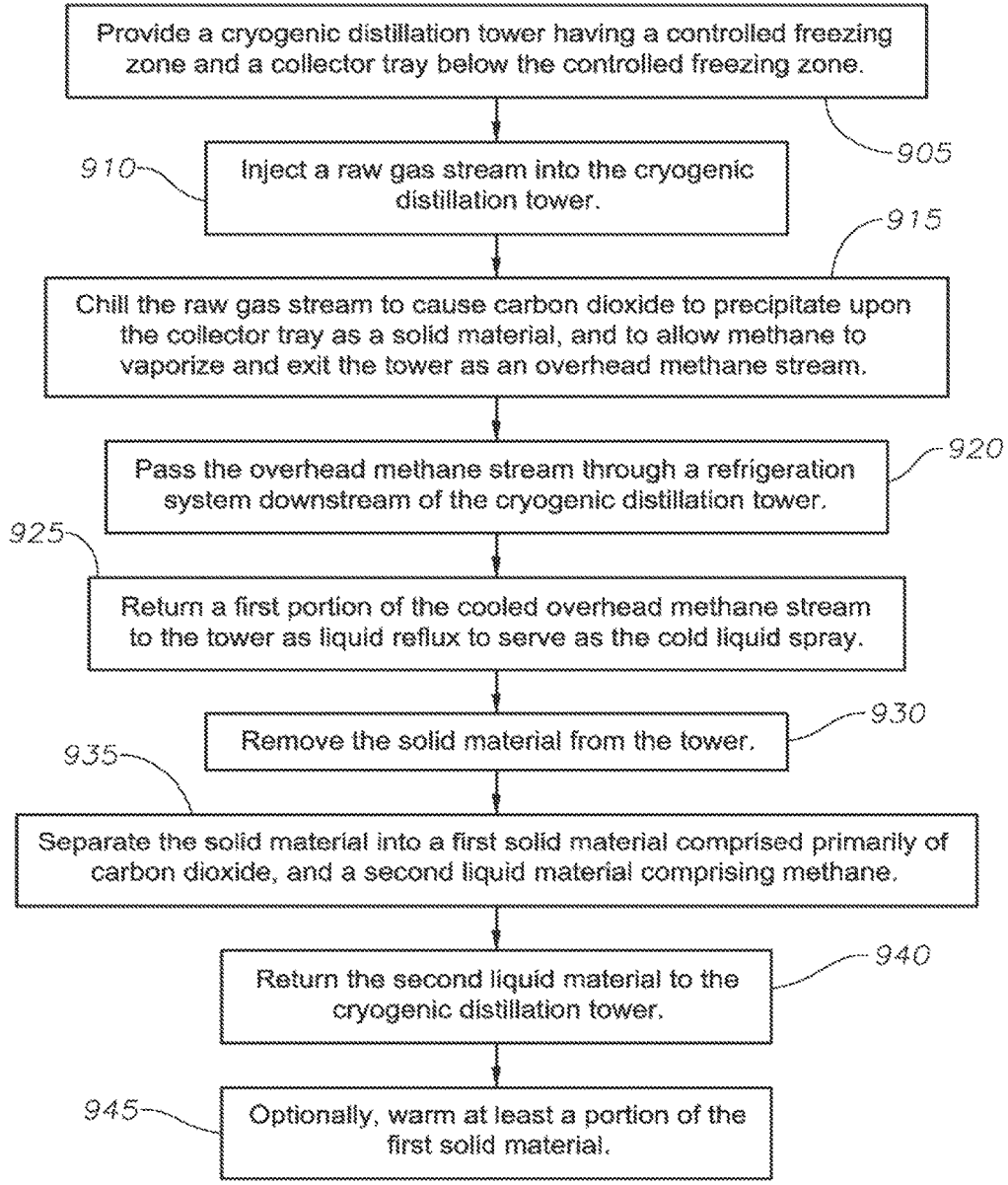

CRYOGENIC SYSTEM FOR REMOVING ACID GASES FROM A HYDROCARBON GAS STREAM

CROSS-REFERENCE TO RELATED APPLICATION

This application is a divisional application of U.S. patent application Ser. No. 13/387,615 filed on Jan. 27, 2012 which is a National Stage of International Application No. PCT/US2010/042927, filed Jul. 22, 2010, which claims the benefit of U.S. Provisional Patent Application 61/240,850 filed Sep. 9, 2009 entitled Cryogenic System for Removing Acid Gases From a Hydrocarbon Gas Stream, With Solid $CO_2$ Recovery, the entirety of which are incorporated by reference herein.

BACKGROUND OF THE INVENTION

This section is intended to introduce various aspects of the art, which may be associated with exemplary embodiments of the present disclosure. This discussion is believed to assist in providing a framework to facilitate a better understanding of particular aspects of the present disclosure. Accordingly, it should be understood that this section should be read in this light, and not necessarily as admissions of prior art.

Field Of The Invention

The present invention relates to the field of component separation. More specifically, the present invention relates to the separation of carbon dioxide and other acid gases from a hydrocarbon fluid stream.

Discussion Of Technology

The production of hydrocarbons from a reservoir oftentimes carries with it the incidental production of non-hydrocarbon gases. Such gases include contaminants such as hydrogen sulfide ($H_2S$) and carbon dioxide ($CO_2$). When $H_2S$ and $CO_2$ are produced as part of a hydrocarbon gas stream (such as methane or ethane), the gas stream is sometimes referred to as "sour gas."

Sour gas is usually treated to remove $CO_2$, $H_2S$, and other contaminants before it is sent downstream for further processing or sale. The separation process creates an issue as to the disposal of the separated contaminants. In some cases, the concentrated acid gas (consisting primarily of $H_2S$ and $CO_2$) is sent to a sulfur recovery unit ("SRU"). The SRU converts the $H_2S$ into benign elemental sulfur. However, in some areas (such as the Caspian Sea region), additional elemental sulfur production is undesirable because there is a limited market. Consequently, millions of tons of sulfur have been stored in large, above-ground blocks in some areas of the world, most notably Canada and Kazakhstan.

While the sulfur is stored on land, the carbon dioxide gas is oftentimes vented to the atmosphere. However, the practice of venting $CO_2$ is sometimes undesirable. One proposal to minimizing $CO_2$ emissions is a process called acid gas injection ("AGI"). AGI means that unwanted sour gases are re-injected into a subterranean formation under pressure and sequestered for potential later use. Alternatively, the carbon dioxide may be used to create artificial reservoir pressure for enhanced oil recovery operations.

To facilitate AGI, it is desirable to have a gas processing facility that separates the acid gas components from the hydrocarbon gases. However, for "highly sour" streams, that is, production streams containing greater than about 15% $CO_2$ and/or $H_2S$, it can be particularly challenging to design, construct, and operate a facility that can economically separate contaminants from the desired hydrocarbons. Many natural gas reservoirs contain relatively low percentages of hydrocarbons (less than 40%, for example) and high percentages of acid gases, principally carbon dioxide, but also hydrogen sulfide, carbonyl sulfide, carbon disulfide and various mercaptans. In these instances, cryogenic gas processing may be beneficially employed.

Cryogenic gas processing is a distillation process sometimes used for gas separation. Cryogenic gas separation generates a cooled overhead gas stream at moderate pressures (e.g., 300-600 pounds per square inch gauge (psig)). In addition, liquefied acid gas is generated as a "bottoms" product. Since the liquefied acid gas has a relatively high density, hydrostatic head can be beneficially used in an AGI well to assist in the injection process. In this respect, the acid gas may be recovered as a liquid at column pressure (e.g. 300-600 psia). This means that the energy required to pump the liquefied acid gas into the formation is lower than the energy required to compress low-pressure acid gases to reservoir pressure.

Cryogenic gas processing has additional advantages. For example, a solvent is not required for the adsorption of carbon dioxide. In addition, methane recovery may be obtained in a single vessel (as opposed to the multi-vessel systems used in the Ryan-Holmes processes). Finally, depending on the refrigeration capacity, a tight $H_2S$ specification, e.g., down to or less than 4 ppm, may be met for the product gas.

Challenges also exist with respect to cryogenic distillation of sour gases. When $CO_2$ is present at concentrations greater than about 5 mol. percent in the gas to be processed, it will freeze out as a solid in a standard cryogenic distillation unit. The formation of $CO_2$ as a solid disrupts the cryogenic distillation process. To circumvent this problem, the assignee has previously designed various Controlled Freeze Zone™ (CFZ™) processes. The CFZ™ process takes advantage of the propensity of carbon dioxide to form solid particles by allowing frozen $CO_2$ particles to form within an open portion of the distillation tower, and then capturing the particles as they fall onto a melt tray. As a result, a clean methane stream (along with any nitrogen or helium present in the raw gas) is generated at the top of the tower, while a cold liquid $CO_2/H_2S$ stream is generated at the bottom of the tower as the bottoms product.

Certain aspects of the CFZ™ process and associated equipment are described in U.S. Pat. Nos. 4,533,372; 4,923,493; 5,062,270; 5,120,338; and 6,053,007.

As generally described in the above U.S. patents, the distillation tower, or column, used for cryogenic gas processing includes a lower distillation zone and an intermediate controlled freezing zone. Preferably, an upper rectification zone is also included. The column operates to create solid $CO_2$ particles by providing a portion of the column having a temperature range below the freezing point of carbon dioxide, but above the boiling temperature of methane at that pressure. More preferably, the controlled freezing zone is operated at a temperature and pressure that permits methane and other light hydrocarbon gases to vaporize, while causing $CO_2$ to form frozen (solid) particles.

As the gas feed stream moves up the column, frozen $CO_2$ particles break out of the feed stream and gravitationally descend from the controlled freezing zone onto a melt tray. There, the particles liquefy. A carbon dioxide-rich liquid stream then flows from the melt tray down to the lower distillation zone at the bottom of the column. The lower distillation zone is maintained at a temperature and pressure at which substantially no carbon dioxide solids are formed, but dissolved methane boils out. In one aspect, a bottom acid gas stream is created in the distillation zone at 30° to 40° F.

The controlled freezing zone includes a cold liquid spray. This is a methane-enriched liquid stream known as "reflux." As the vapor stream of light hydrocarbon gases and entrained sour gases moves upward through the column, the vapor stream encounters the liquid spray. The cold liquid spray aids in breaking out solid $CO_2$ particles while permitting methane gas to evaporate and flow upward into the rectification zone.

In the upper rectification zone, the methane (or overhead gas) is captured and piped away for sale or made available for fuel. In one aspect, the overhead methane stream is released at about −130° F. The overhead gas may be partially liquefied by additional cooling, and a part of the liquid returned to the column as the reflux. The liquid reflux is then injected as the cold spray into the rectification zone and the controlled freezing zone. In this respect, the process of generating cold liquid methane for reflux requires equipment ancillary to the CFZ tower. This equipment includes pipes, nozzles, compressors, separators, pumps, and expansion valves.

The methane produced in the upper rectification zone meets most specifications for pipeline delivery. For example, the methane can meet a pipeline $CO_2$ specification of less than 2 mol. percent, as well as a 4 ppm $H_2S$ specification, if sufficient reflux is generated. However, more stringent specifications for higher purity natural gas exist for applications such as helium recovery, cryogenic natural gas liquids recovery, conversion to liquid natural gas (LNG), and nitrogen rejection.

The more stringent specifications may be met by increasing the quantity of liquid methane reflux. This, in turn, requires larger refrigeration equipment. The more vigorously the operator wishes to remove $CO_2$, the greater the refrigeration requirements become.

There is a need to reduce the refrigeration requirements of the CFZ process while still reducing the $CO_2$ content down to very low levels. There is also a need for a cryogenic gas separation system and accompanying processes that are augmented by other $CO_2$ removal techniques. Further, there is a need for a cryogenic gas separation process that is able to reduce the $CO_2$ and $H_2S$ content of the gas down to levels acceptable for LNG specifications for downstream liquefaction processes without increasing refrigeration equipment capacity.

SUMMARY OF THE INVENTION

A system for removing acid gases from a raw gas stream is provided. In one embodiment, the system includes a cryogenic distillation tower. The distillation tower has an intermediate controlled freezing zone. The controlled freezing zone, or spray section, receives a cold liquid spray comprised primarily of methane. The cold spray is preferably a liquid reflux generated from an overhead loop downstream of the distillation tower.

The cryogenic distillation tower is configured to receive a raw gas stream, and then separate the raw gas stream into (1) an overhead methane gas stream, and (2) a substantially solid material comprised of carbon dioxide.

The system also has refrigeration equipment downstream of the cryogenic distillation tower. The refrigeration equipment serves to cool the overhead methane stream and then return a portion of the overhead methane stream as reflux to the rectification zone in the cryogenic distillation tower. A portion of the liquid reflux may be sprayed in the controlled freezing zone to cause precipitation of solid carbon dioxide particles.

The system further comprises a collector tray. The collector tray is positioned below the controlled freezing zone for receiving the solid $CO_2$ particles as they are precipitated in the controlled freezing zone. Preferably, the collector tray has an inclined base to direct precipitate into a central downcomer. The downcomer, in turn, may optionally include a mechanical translation device such as an auger to move a slurry that includes the solid $CO_2$ material out of the cryogenic distillation tower and towards a $CO_2$ recovery facility.

The $CO_2$ recovery facility is preferably comprised of a plurality of filters. Thus, the system includes at least a first filter for receiving the slurry. The slurry is separated into a frozen or solid material (referred to as a "filter cake") and a liquid material (referred to as a "filtrate"). The solid material is comprised primarily of carbon dioxide, while the liquid material comprises methane. The liquid material may also comprise smaller amounts of carbon dioxide, hydrogen sulfide, mercury and heavy hydrocarbons. It should be understood that as used herein, the slurry is referred to as include a solid material and a liquid material, but may further include a gaseous material or other non-solid material. The liquid material portion of the slurry may be separated therefrom for further processing. The processing of the non-solid material may convert liquids into gases and/or solids, which may subsequently be used for various purposes, such as reinjection to the recovery facility. However, for ease of reference, the non-solid portion of the slurry, once separated from the slurry, may be referred to herein as the liquid material regardless of the state of the material.

The system further includes a liquid return line. The liquid return line returns at least a portion of the liquid material from the $CO_2$ recovery facility to the cryogenic distillation tower. There, further processing of the methane and any acid gas components entrained therein takes place.

The cryogenic distillation tower preferably includes an upper rectification zone above the controlled freezing zone. The tower may further have a lower distillation zone below the controlled freezing zone. In the latter instance, the cryogenic distillation tower is preferably configured to receive the raw gas stream into the lower distillation zone. Moreover, the tower receives the liquid material from the liquid return line into the lower distillation zone. Further processing of the methane and trace acid gas components takes place in the lower distillation zone. There, the methane vaporizes in the warm lower distillation zone, travels upward through the controlled freezing zone and upper rectification zone, and merges with the overhead methane stream. The carbon dioxide components will mostly vaporize in the lower distillation zone, move upward into the controlled freezing zone, and precipitate back down on the collector tray. The $CO_2$ components are then transported to the $CO_2$ recovery facility with the slurry.

When the tower includes a lower distillation zone, acid gases will fall out of the relatively warm lower distillation zone as a bottoms liquid stream. The bottoms liquid stream may comprise ethane, propane, butane, hydrogen sulfide, or combinations thereof, in substantially liquid phase. Carbon dioxide may also be present.

In one arrangement, the cryogenic distillation tower does not include a lower distillation zone. In this instance, the raw gas stream is injected into the distillation tower in the controlled freezing zone. In addition, the liquid return line merges at least a portion of the liquid material with the raw gas stream before the raw gas stream is injected into the cryogenic distillation tower, or simultaneously therewith. The distillation tower will not have a bottoms stream for capturing hydrogen sulfide; instead, hydrogen sulfide and trace elements of methane and carbon dioxide are captured within the $CO_2$ recovery facility through second and, optionally, third and fourth filters. Hydrogen sulfide and the trace elements of methane and carbon dioxide are released from the filters as cold liquid filtrate. The filtrate is subsequently processed in a distillation tower so that a recovery methane stream is separated from the acid gases. The recovery methane stream is merged with the overhead methane stream for sale as a commercial product.

In either embodiment, a heat exchanger is optionally provided at the end of the $CO_2$ recovery facility. The heat exchanger is configured to warm substantially solid material taken at least partially from a final-stage filter cake to produce a substantially pure carbon dioxide stream, in liquid phase. The substantially solid material is warmed by using, for example, the raw gas stream as a heat source.

A method for removing acid gases from a raw gas stream using an acid gas removal system is also provided herein. The raw gas stream comprises methane, carbon dioxide and, most likely, other components such as ethane and hydrogen sulfide.

In one embodiment, the method first includes providing a cryogenic distillation tower. The tower has a controlled freezing zone that receives a cold liquid spray comprised primarily of methane. The tower further has a collector tray below the controlled freezing zone.

The method also includes injecting the raw gas stream into the cryogenic distillation tower. In one arrangement, the raw gas stream is injected into the distillation tower in a lower distillation zone below the controlled freezing zone. In another arrangement, the raw gas stream is injected into the distillation tower in the controlled freezing zone itself. Preferably, the raw gas stream has been substantially dehydrated before it is injected into the distillation tower.

The method further includes chilling the raw gas stream. Chilling the raw gas stream causes carbon dioxide within the raw gas stream to precipitate upon the collector tray as a substantially solid material and become a slurry thereon. At the same time, the pressure in the distillation tower is lower than a feed stream, causing methane within the raw gas stream to flash. The methane travels through a rectification zone above the controlled freezing zone and exits the cryogenic distillation tower as an overhead methane stream.

The method also includes passing the overhead methane stream through a refrigeration system downstream of the cryogenic distillation tower. The refrigeration system cools at least a portion of the overhead methane stream to a liquid. The method additionally includes returning a portion of the cooled overhead methane stream to the cryogenic distillation tower as liquid reflux. A portion of the liquid reflux, in turn, may serve as the cold liquid spray.

Also as part of the method, the substantially solid material is removed from the cryogenic distillation tower. In one aspect, removal of the substantially solid material is accomplished through use of a mechanical translation device such as a screw conveyor or auger. The auger may reside within a downcomer of the collector tray as indicated above. The auger cuts through the substantially solid material, or slurry, translating it out of the distillation tower and towards solid $CO_2$ processing equipment. It is preferred that the collector tray operates at a temperature of, for example, about −70° F. to −80° F. This is at or slightly below the freezing point of the $CO_2$ component.

The method further includes separating the substantially solid material into a substantially solid filter cake and a substantially liquid filtrate. The filter cake is comprised primarily of carbon dioxide, while the filtrate comprises methane and residual carbon dioxide. The filtrate may include other components such as heavy hydrocarbons and even light aromatics.

The separating step may be accomplished by passing the substantially solid material or slurry through a first filter. This produces a first filter cake comprised primarily of solid carbon dioxide, and a first filtrate comprising methane and carbon dioxide, in liquid phase. The first filter may be, for example, a porous media or a centrifuge.

The separating step may further comprise rinsing the first filter cake using a cold carbon dioxide stream, mixing the first filter cake to produce a first solid-liquid slurry, and delivering the first solid-liquid slurry to a second filter. The second filter produces a second filter cake comprised primarily of solid carbon dioxide, and a second filtrate comprising methane and carbon dioxide, again in liquid phase.

While a single separation step may be sufficient in some implementations, additional $CO_2$ removal may be undertaken. For example, the separating step may further comprise rinsing the second filter cake using the cold carbon dioxide stream, mixing the second filter cake to produce a solid-liquid slurry, and delivering the solid-liquid slurry to yet a third filter. This produces a third filter cake comprised primarily of solid carbon dioxide, and a third filtrate comprising yet a smaller amount of methane and carbon dioxide, again in liquid phase.

The method also includes returning at least a portion of the second liquid material to the cryogenic distillation tower. In one aspect, the second liquid material is directed back to the lower distillation zone. In another aspect, the second liquid material is merged with the raw gas stream and is re-injected into the tower in the controlled freezing zone.

In one embodiment of the method, the first filtrate and the second filtrate are combined. The combined fluid from the filtrates forms the liquid filtrate that is returned to the cryozenic distillation tower. In this instance, the combined liquid filtrate is preferably injected into the lower distillation zone.

In another embodiment of the method, only the first filtrate is returned to the distillation tower as the liquid filtrate. In this instance, the first filtrate may be returned back to the controlled freezing zone. The distillation tower preferably will not have a lower distillation zone. The second and, optionally, third (or subsequent) filtrates are delivered to a separate, downstream distillation tower where residual acid gases are finally separated from methane. In this instance, a recovery methane stream is obtained that is merged with the overhead methane stream of the cryogenic distillation tower for sale.

BRIEF DESCRIPTION OF THE DRAWINGS

So that the manner in which the present inventions can be better understood, certain illustrations, charts and/or flow charts are appended hereto. It is to be noted, however, that the drawings illustrate only selected embodiments of the inventions and are therefore not to be considered limiting of scope, for the inventions may admit to other equally effective embodiments and applications.

FIG. 2A is a plan view of a melt tray, in one embodiment. The melt tray resides within the tower below the controlled freezing zone.

FIG. 2B is a cross-sectional view of the melt tray of FIG. 2A, taken across line B-B.

FIG. 2C is a cross-sectional view of the melt tray of FIG. 2A, taken across line C-C.

FIG. 3 is an enlarged side view of stripping trays in the lower distillation zone of the distillation tower, in one embodiment.

FIG. 6A is a plan view of a collector tray, in one embodiment. In one arrangement of a gas processing facility, the collector tray resides within the tower below the controlled freezing zone.

FIG. 6B is a cross-sectional view of the collector tray of FIG. 6A, taken across line B-B.

FIG. 6C is a cross-sectional view of the collector tray of FIG. 6A, taken across line C-C.

FIG. 6D is a cross-sectional view of the collector tray of FIG. 6A, in an alternate embodiment. The view is again taken across line B-B.

FIG. 6D is employed.

FIG. 6D is again employed.

FIG. 9 presents a flowchart for a method of removing acid gases from a gas stream in accordance with the present invention, in one embodiment.

DETAILED DESCRIPTION OF CERTAIN EMBODIMENTS

Definitions

As used herein, the term "hydrocarbon" refers to an organic compound that includes primarily, if not exclusively, the elements hydrogen and carbon. Hydrocarbons generally fall into two classes: aliphatic, or straight chain hydrocarbons, and cyclic, or closed ring hydrocarbons, including cyclic terpenes. Examples of hydrocarbon-containing materials include any form of natural gas, oil, coal, and bitumen that can be used as a fuel or upgraded into a fuel.

As used herein, the term "hydrocarbon fluids" refers to a hydrocarbon or mixtures of hydrocarbons that are gases or liquids. For example, hydrocarbon fluids may include a hydrocarbon or mixtures of hydrocarbons that are gases or liquids at formation conditions, at processing conditions or at ambient conditions (15° C. and 1 atm pressure). Hydrocarbon fluids may include, for example, oil, natural gas, coal bed methane, shale oil, pyrolysis oil, pyrolysis gas, a pyrolysis product of coal, and other hydrocarbons that are in a gaseous or liquid state.

The term "mass transfer device" refers to any object that receives fluids to be contacted, and passes those fluids to other objects, such as through gravitational flow. One non-limiting example is a tray for stripping out certain fluids. A grid packing is another example.

As used herein, the term "fluid" refers to gases, liquids, and combinations of gases and liquids, as well as to combinations of gases and solids, and combinations of liquids and solids.

As used herein, the term "condensable hydrocarbons" means those hydrocarbons that condense at about 15° C. and one atmosphere absolute pressure. Condensable hydrocarbons may include, for example, a mixture of hydrocarbons having carbon numbers greater than 4.

As used herein, the term "closed loop refrigeration system" means any refrigeration system wherein an external working fluid such as propane or ethylene is used as a coolant to chill an overhead methane stream. This is in contrast to an "open loop refrigeration system" wherein a portion of the overhead methane stream itself is used as the working fluid.

As used herein, the term "subsurface" refers to geologic strata occurring below the earth's surface.

Description Of Specific Embodiments

Figure 1:
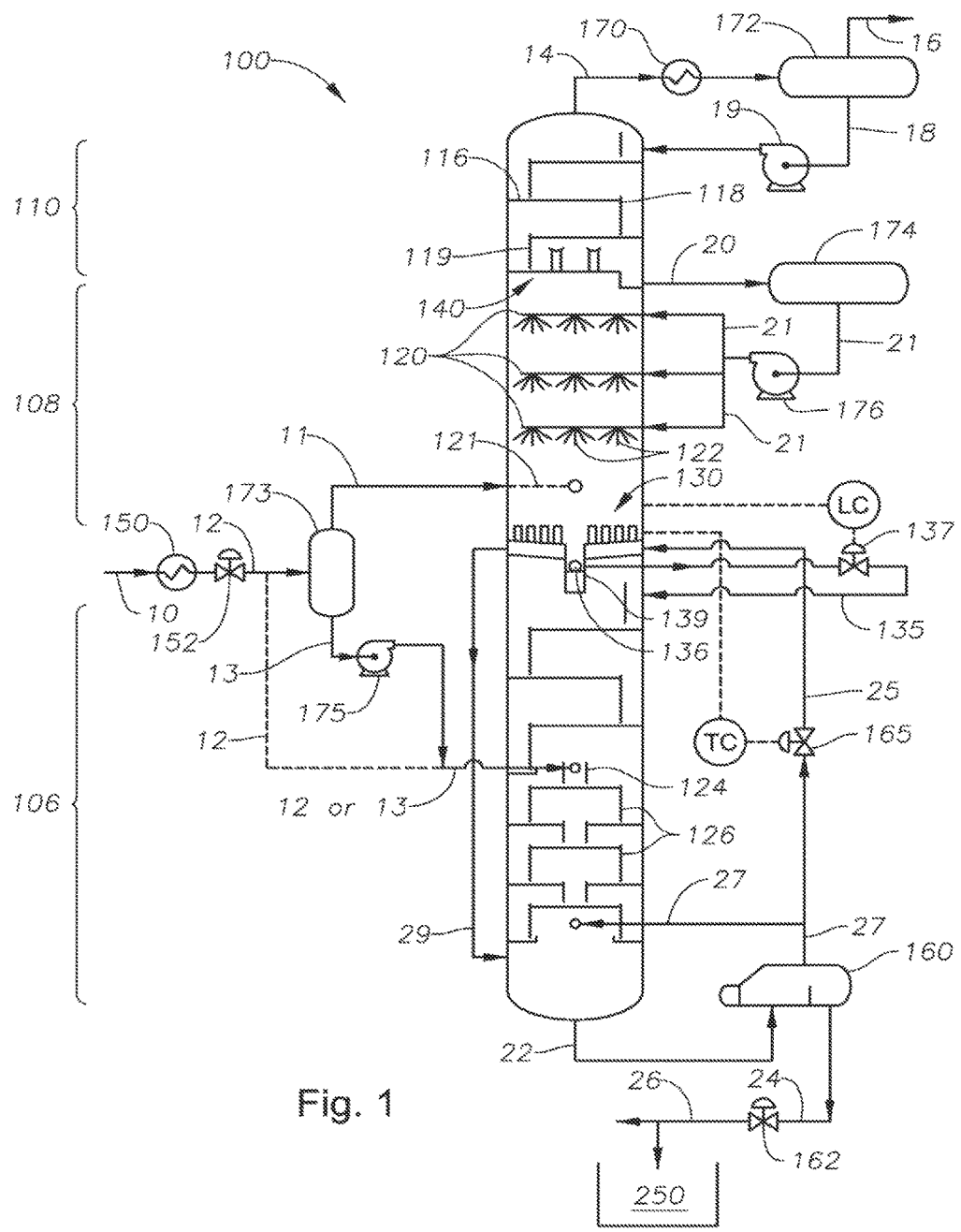
FIG. 1 is a side view of an illustrative CFZ distillation tower, in one embodiment. A chilled raw gas stream is seen being injected into the intermediate controlled freezing zone of the tower.

FIG. 1 presents a schematic view of a cryogenic distillation tower 100 as may be used in connection with the present inventions, in one embodiment. The cryogenic distillation tower 100 may be interchangeably referred to herein as a "cryogenic distillation tower," a "column," a "CFZ column," or a "splitter tower."

The cryogenic distillation tower 100 of FIG. 1 receives an initial fluid stream 10. The fluid stream 10 is comprised primarily of production gases. Typically, the fluid stream represents a dried gas stream from a wellhead (not shown), and contains about 65% to about 95% methane. However, the fluid stream 10 may contain a lower percentage of methane, such as about 30%> to 65%, or even 20% to 40%.

The methane may be present along with trace elements of other hydrocarbon gases such as ethane. In addition, trace amounts of helium and nitrogen may be present. In the present application, the fluid stream 10 will also include certain contaminants. These include acid gases such as $CO_2$ and $H_2S$.

The initial fluid stream 10 may be at a post-production pressure of approximately 600 pounds per square inch (psi) or lower. In some instances, the pressure of the initial fluid stream 10 may be up to about 750 psi or even 1,000 psi.

The fluid stream 10 is typically chilled before entering the distillation tower 100. A heat exchanger 150, such as a shell-and-tube exchanger, is provided for the initial fluid stream 10. A refrigeration unit (not shown) provides cooling fluid (such as liquid propane) to heat exchanger 150 to bring the temperature of the initial fluid stream 10 down to about −30° F. to −40° F. The chilled fluid stream may then be moved through an expansion device 152. The expansion device 152 may be, for example, a Joule-Thompson ("J-T") valve.

The expansion device 152 serves as an expander to obtain additional cooling of the fluid stream 10. Preferably, partial liquefaction of the fluid stream 10 is also created. A Joule-Thompson (or "J-T") valve is preferred for gas feed streams that are prone to forming solids. The expansion device 152 is preferably mounted close to the cryogenic distillation tower 100 to minimize heat loss in the feed piping.

As an alternative to a J-T valve, the expander device 152 may be a turbo expander. A turbo expander provides greater cooling and creates a source of shaft work for processes like the refrigeration unit mentioned above. The refrigeration unit is part of the heat exchanger 150. In this manner, the operator may minimize the overall energy requirements for the distillation process. However, the turbo-expander may not handle frozen particles as well as the J-T valve.

In either instance, the heat exchanger 150 and the expander device 152 convert the initial fluid stream 10 into a chilled fluid stream 12. Preferably, the temperature of the chilled fluid stream 12 is around −40° F. to −70° F. In one aspect, the cryogenic distillation tower 100 is operated at a pressure of about 550 psi, and the chilled fluid stream 12 is at approximately −62° F. At these conditions, the chilled fluid stream 12 is in a substantially liquid phase, although some vapor phase may inevitably be entrained into the chilled fluid stream 12. Most likely, no solids formation has arisen from the presence of $CO_2$.

The cryogenic distillation tower 100 is divided into three primary sections. These are a lower distillation zone 106, an intermediate controlled freezing zone, or "spray section" 108, and an upper distillation or "rectification" zone 110. In the tower arrangement of FIG. 1, the chilled fluid stream 12 is introduced into the distillation tower 100 at the controlled freezing zone 108. However, the chilled fluid stream 12 may alternatively be introduced near the top of the lower distillation zone 106.

It is noted in the arrangement of FIG. 1 that the lower distillation zone 106, the intermediate spray section 108, the upper rectification zone 110, and all the components are housed within a single vessel. However, for offshore applications in which height of the tower 100 and motion considerations may need to be considered, or for remote locations in which transportation limitations are an issue, the distillation tower 110 may optionally be split into two separate pressure vessels (not shown). For example, the lower distillation zone 106 and the controlled freezing zone 108 may be located in one vessel, while the upper rectification zone 110 is in another vessel. External piping would then be used to interconnect the two vessels.

In either embodiment, the temperature of the lower distillation zone 106 is higher than the feed temperature of the chilled fluid stream 12. The temperature of the lower distillation zone 106 is designed to be well above the boiling point of the methane in the chilled fluid stream 12 at the operating pressure of the column 100. In this manner, methane is preferentially stripped from the heavier hydrocarbon and liquid acid gas components. Of course, those of ordinary skill in the art will understand that the liquid within the distillation tower 100 is a mixture, meaning that the liquid will "boil" at some intermediate temperature between pure methane and pure $CO_2$. Further, in the event that there are heavier hydrocarbons present in the mixture (such as ethane or propane), this will increase the boiling temperature of the mixture. These factors become design considerations for the operating temperatures within the distillation tower 100.

In the lower distillation zone 106, the $CO_2$ and any other liquid-phase fluids gravitationally fall towards the bottom of the cryogenic distillation tower 100. At the same time, methane and other vapor-phase fluids break out and rise upwards towards the top of the tower 100. This separation is accomplished primarily through the density differential between the gas and liquid phases. However, the separation process is optionally aided by internal components within the distillation tower 100. As described below, these include a melt tray 130, a plurality of advantageously-configured mass transfer devices 126, and an optional heater line 25. Side reboilers (not shown) may likewise be added to the lower distillation zone 106 to facilitate removal of $CO_2$ and heat transfer.

Referring again to FIG. 1, the chilled fluid stream 12 may be introduced into the column 100 near the top of the lower distillation zone 106. Alternatively, it may be desirable to introduce the feed stream 12 into the intermediate spray or controlled freezing zone 108 above the melt tray 130. The point of injection of the chilled fluid stream 12 is a design issue dictated primarily by the composition of the initial fluid stream 10.

It may be preferable to inject the chilled fluid stream 12 directly into the lower distillation zone 106 through a two-phase flashbox type device (or vapor distributor) 124 in the column 100. The use of a flashbox 124 serves to partially separate the two-phase vapor-liquid mixture in the chilled fluid stream 12. The flashbox 124 may be slotted such that the two-phase fluid impinges against baffles in the flashbox 124.

If significant liquid slugging or frequent process upsets are anticipated, the chilled fluid stream 12 may need to be partially separated in a vessel 173 prior to feeding the column 100. In this case, the chilled feed stream 12 may be separated in a two phase vessel 173. Vapor leaves the two phase vessel 173 through a vessel inlet line 11, where it enters the column 100 through an inlet distributor 121. The gas then travels upward through the column 100. Liquid 13 is discharged from the two phase vessel 173. The liquid 13 is directed into the column 100 through the distributor 124. The liquid 13 can be fed to the column 100 by gravity or by a pump 175.

In either arrangement, that is, with or without the two phase vessel 173, the chilled fluid stream 12 (or 11) enters the column 100. The liquid component leaves the flashbox 124 and travels down a collection of stripping trays 126 within the lower distillation zone 106. The stripping trays 126 include a series of downcomers 129 and weirs 128. These are described more fully below in connection with FIG. 3. The stripping trays 126, in combination with the warmer temperature in the lower distillation zone 106, cause methane to break out of solution. The resulting vapor carries the methane and any entrained carbon dioxide molecules that have boiled off.

The vapor further proceeds upward through chimneys 131 of the melt tray 130 (seen in FIG. 2B) and into the freeze zone 108. The melt tray risers 131 act as a vapor distributor for uniform distribution through the freeze zone 108. The vapor will then contact cold liquid from spray headers 120 to "freeze out" the $CO_2$. Stated another way, $CO_2$ will freeze and then precipitate or "snow" back onto the melt tray 130. The solid $CO_2$ then melts and gravitationally flows in liquid form down the melt tray 130 and through the lower distillation zone 106 there below.

As will be discussed more fully below, the spray section 108 is an intermediate freezing zone of the cryogenic distillation tower 100. With the alternate configuration in which the chilled fluid stream 12 is separated in vessel 173 prior to entering the tower 100, a part of the separated liquid/solid slurry 13 is introduced into the tower 100 immediately above the melt tray 130. Thus, a liquid-solid mixture of sour gas and heavier hydrocarbon components will flow from the distributor 121, with solids and liquids falling down onto the melt tray 130.

The melt tray 130 is configured to gravitationally receive liquid and solid materials, primarily $CO_2$ and $H_2S$, from the intermediate spray section 108. The melt tray 130 serves to warm the liquid and solid materials and direct them downward through the lower distillation zone 106 in liquid form for further purification. The melt tray 130 collects and warms the solid-liquid mixture from the controlled freezing zone 108 in a pool of liquid. The melt tray 130 is designed to release vapor flow back to the controlled freezing zone 108, to provide adequate heat transfer to melt the solid $CO_2$, and to facilitate liquid/slurry drainage to the lower distillation or lower distillation zone 106 of the column 100 below the melt tray 130.

FIG. 2A provides a plan view of the melt tray 130, in one embodiment. FIG. 2B provides a cross-sectional view of the melt tray 130, taken across line B-B of FIG. 2A. FIG. 2C shows a cross-sectional view of the melt tray 130, taken across line C-C. The melt tray 130 will be described with reference to these three drawings collectively.

First, the melt tray 130 includes a base 134. The base 134 may be a substantially planar body. However, in the preferred embodiment shown in FIGS. 2A, 2B and 2C, the base 134 employs a substantially non-planar profile. The non-planar configuration provides an increased surface area for contacting liquids and solids landing on the melt tray 130 from the intermediate controlled freezing zone 108. This serves to increase heat transfer from the vapors passing up from the lower distillation zone 106 of the column 100 to the liquids and thawing solids. In one aspect, the base 134 is corrugated. In another aspect, the base 134 is substantially sinusoidal. This aspect of the tray design is shown in FIG. 2B. It is understood that other non-planar geometries may alternatively be used to increase the heat transfer area of the melt tray 130.

The melt tray base 134 is preferably inclined. The incline is demonstrated in the side view of FIG. 2C. Although most solids should be melted, the incline serves to ensure that any unmelted solids in the liquid mixture drain off of the melt tray 130 and into the lower distillation zone 106 there below.

In the view of FIG. 2C, a sump or "downcomer" 138 is seen central to the melt tray 130. The melt tray base 134 slopes inwardly towards the downcomer 138 to deliver the solid-liquid mixture. The base 134 may be sloped in any manner to facilitate gravitational liquid draw-off.

As described in U.S. Pat. No. 4,533,372, the melt tray was referred to as a "chimney tray." This was due to the presence of a single venting chimney. The chimney provided an opening through which vapors may move upward through the chimney tray. However, the presence of a single chimney meant that all gases moving upward through the chimney tray had to egress through the single opening. On the other hand, in the melt tray 130 of FIGS. 2A, 2B and 2C, a plurality of chimneys 131 (or "risers") is provided. The use of multiple chimneys 131 provides improved vapor distribution. This contributes to better heat/mass transfer in the intermediate controlled freezing zone 108.

The chimneys 131 may be of any profile. For instance, the chimneys 131 may be round, rectangular, or any other shape that allows vapor to pass through the melt tray 130. The chimneys 131 may also be narrow and extend upwards into the intermediate spray section 108. This enables a beneficial pressure drop to distribute the vapor evenly as it rises into the CFZ controlled freezing zone 108. The chimneys 131 are preferably located on peaks of the corrugated base 134 to provide additional heat transfer area.

The top openings of the chimneys 131 are preferably covered with hats or caps 132. This minimizes the chance that solids dropping from the controlled freezing zone 108 can avoid falling onto the melt tray 130. In FIGS. 2A, 2B and 2C, caps 132 are seen above each of the chimneys 131.

The melt tray 130 may also be designed with bubble caps. The bubble caps define convex indentations in the base 134 rising from underneath the melt tray 130. The bubble caps further increase surface area in the melt tray 130 to provide additional heat transfer to the $CO_2$-rich liquid. With this design, a suitable liquid draw oil, such as an increased incline angle, should be provided to insure that liquid is directed to the stripping trays 126 below.

Referring again to FIG. 1, the melt tray 130 may also be designed with an external liquid transfer system. The transfer system serves to ensure that all liquid is substantially free of solids and that sufficient heat transfer has been provided. The transfer system first includes a draw-off nozzle 136. In one embodiment, the draw-off nozzle 136 resides within the draw-off sump, or downcomer 138 (seen in FIG. 2C). Fluids collected in the downcomer 138 are delivered to a transfer line 135. Flow through the transfer line 135 may be controlled by a control valve 137 and a level controller "LC" (seen in FIG. 1). Fluids are returned to the lower distillation zone 106 via the transfer line 135. If the liquid level is too high, the control valve 137 opens; if the level is too low, the control valve 137 closes. If the operator chooses not to employ the transfer system in the lower distillation zone 106, then the control valve 137 is closed and fluids are directed immediately to the mass transfer devices, or "stripping trays" 126 below the melt, tray 130 for stripping via an overflow downcomer 139.

Whether or not an external transfer system is used, solid $CO_2$ is warmed on the melt tray 130 and converted to a $CO_2$-rich liquid. The melt tray 130 is heated from below by vapors from the lower distillation zone 106. Supplemental heat may optionally be added to the melt tray 130 or just above the melt tray base 134 by various means such as heater line 25. The heater line 25 utilizes thermal energy already available from a bottom reboiler 160 to facilitate thawing of the solids.

The $CO_2$-rich liquid is drawn off from the melt tray 130 under liquid level control and gravitationally introduced to the lower distillation zone 106. As noted, a plurality of stripping trays 126 is provided in the lower distillation zone 106 below the melt tray 130. The stripping trays 126 are preferably in a substantially parallel relation, one above the other. Each of the stripping trays 126 may optionally be positioned at a very slight incline, with a weir such that a liquid level is maintained on the tray. Fluids gravitationally flow along each tray, over the weir, and then flow down onto the next tray via a downcomer.

The stripping trays 126 may be in a variety of arrangements. The stripping trays 126 may be arranged in generally horizontal relation to form a sinusoidal, cascading liquid flow. However, it is preferred that the stripping trays 126 be arranged to create a cascading liquid flow that is divided by separate stripping trays substantially along the same horizontal plane. This is shown in the arrangement of FIG. 3, where the liquid flow is split at least once so that liquid falls into two opposing downcomers 129.

FIG. 3 provides a side view of a stripping tray 126 arrangement, in one embodiment. Each of the stripping trays 126 receives and collects fluids from above. Each stripping tray 126 preferably has a weir 128 that serves as a dam to enable the collection of a small pool of fluid on each of the stripping trays 126. The buildup may be ½ to 1 inch, though any height may be employed. A waterfall effect is created by the weirs 128 as fluid falls from tray 126 to tray 126. in one aspect, no incline is provided to the stripping trays 126, but the waterfall effect is created through a higher weir 128 configuration. The fluid is contacted with upcoming vapor rich in lighter hydrocarbons that strip out the methane from the cross flowing liquid in this "contact area" of the trays 126. The weirs 128 serve to dynamically seal the downcotners 129 to help prevent vapor from bypassing through the downcomers 129 and to further facilitate the breakout of hydrocarbon gases.

The percentage of methane in the liquid becomes increasingly small as the liquid moves downward through the lower distillation zone 106. The extent of distillation depends on the number of trays 126 in the lower distillation zone 106. in the upper part of the lower distillation zone 106, the methane content of the liquid may be as high as 25 mol percent, while at the bottom stripping tray the methane content may be as low as 0.04 mol percent. The methane content flashes out quickly along the stripping trays 126 (or other mass transfer devices). The number of mass transfer devices used in the lower distillation zone 106 is a matter of design choice based on the composition of the raw gas stream 10. However, only a few levels of stripping trays 126 need be typically utilized to remove methane to a desired level of 1% or less in the liquefied acid gas, for example.

Various individual stripping tray 126 configurations that facilitate methane breakout may be employed. The stripping tray 126 may simply represent a panel with sieve holes or bubble caps. However, to provide further heat transfer to the fluid and to prevent unwanted blockage due to solids, so called "jet trays" may be employed below the melt tray. In lieu of trays, random or structured packing may also be employed.

Figure 4A:
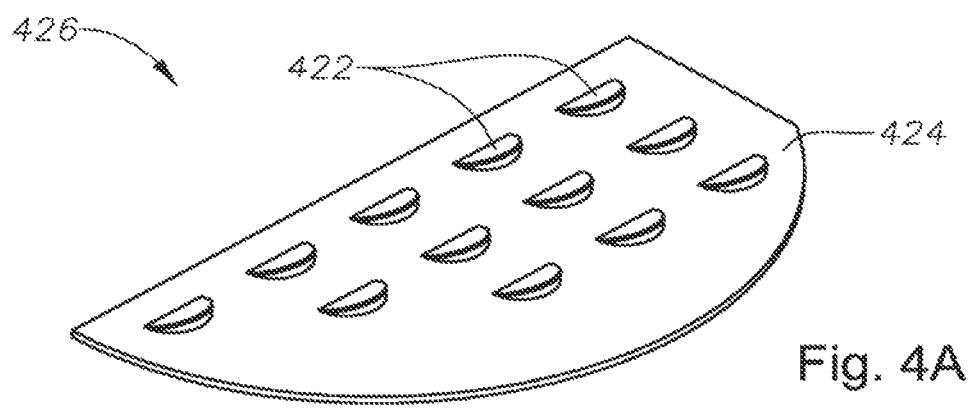
FIG. 4A is a perspective view of a jet tray as may be used in either the lower distillation zone or in the upper rectification zone of the distillation tower, in one embodiment.
Figure 4B:
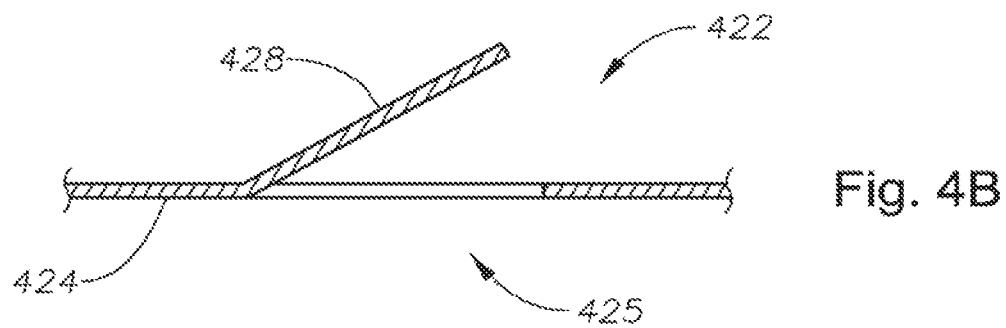
FIG. 4B is a side view of one of the openings in the jet tray of FIG. 4A.

FIG. 4A provides a plan view of an illustrative jet tray 426, in one embodiment. FIG. 4B provides a cross-sectional view of a jet tab 422 from the jet tray 426. As shown, each jet tray 426 has a body 424, with a plurality of jet tabs 422 formed within the body 424. Each jet tab 422 includes an inclined tab member 428 covering an opening 425. Thus, a jet tray 426 has a plurality of small openings 425.

In operation, one or more jet trays 426 may be located in the stripping 106 and/or rectification 110 sections of the tower 100. The trays 426 may be arranged with multiple passes such as the pattern of stripping trays 126 in FIG. 3. However, any tray or packing arrangement may be utilized that facilitates the breakout of methane gas. Fluid cascades down upon each jet tray 426. The fluids then flow along the body 424. The tabs 422 are optimally oriented to move the fluid quickly and efficiently across the tray 426. An adjoined downcomer (not shown) may optionally be provided to move the liquid to the subsequent tray 426. The openings 425 also permit gas vapors released during the fluid movement process in the lower distillation zone 106 to travel upwards more efficiently to the melt tray 130 and through the chimneys 131.

In one aspect, the trays (such as trays 126 or 426) may be fabricated from fouling-resistant materials, that is, materials that prevent solids-buildup. Fouling-resistant materials are utilized in some processing equipment to prevent the buildup of corrosive metal particles, polymers, salts, hydrates, catalyst fines, or other chemical solids compounds. In the case of the cryogenic distillation tower 100, fouling resistant materials may be used in the trays 126 or 426 to limit sticking of $CO_2$ solids. For example, a Teflon™ coating may be applied to the surface of the trays 126 or 426.

Alternatively, a physical design may be provided to ensure that the $CO_2$ does not start to build up in solid form along the inner diameter of the distillation tower 100. In this respect, the jet tabs 422 may be oriented to push liquid along the wall of the tower 100, thereby preventing solids accumulation along the wall of the tower 100 and ensuring good vapor-liquid contact.

In any of the tray arrangements, as the down-flowing liquid hits the stripping trays 126, separation of materials occurs. Methane gas breaks out of solution and moves upward in vapor form. The $CO_2$, however, is cold enough and in high enough concentration that it remains in its liquid form and travels down to the bottom of the lower distillation zone 106. The liquid is then moved out of the cryogenic distillation tower 100 in an exit line as a bottoms fluid stream 22.

Upon exiting the distillation tower 100, the bottoms fluid stream 22 enters a reboiler 160. In FIG. 1, the reboiler 160 is a kettle-type vessel that provides reboiled vapor to the bottom of the stripping trays. A reboiled vapor line is seen at 27. In addition, reboiled vapor may be delivered through a heater line 25 to provide supplemental heat to the melt tray 130. The supplemental heat is controlled through a valve 165 and temperature controller TC. Alternately, a heat exchanger, such as a thermosyphon heat exchanger (not shown) may be used for the initial fluid stream 10 to economize energy. In this respect, the liquids entering the reboiler 160 remain at a relatively low temperature, for example, about 30° to 40° F. By heat integrating with the initial fluid stream 10, the operator may warm the cool bottoms fluid stream 22 from the distillation tower 100 while pre-cooling the production fluid stream 10. For this case, the fluid providing supplemental heat through line 25 is a mixed phase return from the reboiler 160.

It is contemplated that under some conditions, the melt tray 130 may operate without heater line 25. In these instances, the melt tray 130 may be designed with an internal heating feature such as an electric heater. However, it is preferred that a heat system be offered that employs the heat energy available in bottoms fluid stream 22. The warm fluids in heater line 25 exist in one aspect at 30° F. to 40° F., so they contain relative heat energy. Thus, in FIG. 1, vapor stream 25 is shown being directed to the melt tray 130 through a heating coil (not shown) on the melt tray 130. The vapor stream 25 may alternatively be tied to the transfer line 135.

In operation, most of the reboiled vapor stream is introduced at the bottom of the column through line 27, above the bottom liquid level and at or below the last stripping tray 126. As the reboiled vapor passes upward through each tray 126, residual methane is stripped out of the liquid. This vapor cools off as it travels up the tower. By the time the vapor stream from line 27 reaches the corrugated melt tray 130, the temperature may drop to about −20° F. to 0° F. However, this remains quite warm compared to the melting solid on the melt tray 130, which may be around −50° F. to −70° F. The vapor still has enough enthalpy to melt the solids $CO_2$ as it comes in contact with the melt tray 130.

Referring back to reboiler 160, fluids in a bottom stream 24 that exit the reboiler 160 in liquid form may optionally pass through an expander valve 162. The expander valve 162 reduces the pressure of the bottom liquid product, effectively providing a refrigeration effect. Thus, a chilled bottom stream 26 is provided. This also creates hydrostatic head. In this respect, the $CO_2$-rich liquid exiting the reboiler 160 may be pumped downhole through one or more AGI wells (seen schematically at 250 in FIG. 1). In some situations, the liquid $CO_2$ may be pumped into a partially recovered oil reservoir as part of an enhanced oil recovery process. Thus, the $CO_2$ could be a miscible injectant. As an alternative, the $CO_2$ may be used as a miscible flood agent for enhanced oil recovery.

Referring again to the lower distillation zone 106 of the distillation tower 100, gas moves up through the lower distillation zone 106, through the chimneys 131 in the melt tray 130, and into the controlled freezing zone 108. The controlled freezing zone 108 defines an open chamber having a plurality of spray nozzles 122. As the vapor moves upward through the controlled freezing zone 108, the temperature of the vapor becomes much colder. The vapor is contacted by liquid methane coming from the spray nozzles 122. This liquid methane is much colder than the upwardly-moving vapor, having been chilled by an external refrigeration unit 170. In one arrangement, the liquid methane exits from spray nozzles 122 at a temperature of approximately −120° F. to −130° F. However, as the liquid methane evaporates, it absorbs heat from its surroundings, thereby reducing the temperature of the upwardly-moving vapor. The vaporized methane also flows upward due to its reduced density (relative to liquid methane) and the pressure gradient within the tower 100.

As the methane vapors move further up the cryogenic distillation tower 100, they leave the controlled freezing zone 108 and enter the upper rectification zone 110. The vapors continue to move upward along with other light gases broken out from the original chilled fluid stream 12. The combined hydrocarbon vapors move out of the top of the cryogenic distillation tower 100, becoming an overhead methane stream 14.

The hydrocarbon gas in overhead methane stream 14 is moved into the external refrigeration unit 170. In one aspect, the refrigeration unit 170 uses an ethylene refrigerant or other refrigerant capable of chilling the overhead methane stream 14 down to about −135° F. to −145° F. This serves to at least partially liquefy the overhead methane stream 14. The refrigerated methane stream 14 is then moved to a reflux condenser or separation chamber 172.

The separation chamber 172 is used to separate gas 16 from liquid reflux 18. The gas 16 represents the lighter hydrocarbon gases, primarily methane, from the original raw gas stream 10. Nitrogen and helium may also be present. The methane gas 16 is, of course, the "product" ultimately sought to be captured and sold commercially, along with any ethane.

A portion of the overhead methane stream 14 exiting the refrigeration unit 170 remains condensed. This portion becomes liquid reflux 18 that is separated in the separation chamber 172 and returned to the tower 100. A pump 19 may be used to move the liquid reflux 18 back into the tower 100. Alternatively, the separation chamber 172 is mounted above the tower 100 to provide a gravity feed of the liquid reflux 18. The liquid reflux 18 will include any carbon dioxide that escaped from the upper rectification zone 110. However, most of the liquid reflux 18 is methane, typically 95% or more, with nitrogen (if present in the initial fluid stream 10) and traces of hydrogen sulfide (also if present in the initial fluid stream 10).

In one cooling arrangement, the overhead methane stream 14 is taken through an open-loop refrigeration system. In this arrangement, the overhead methane stream 14 is taken through a cross-exchanger to chill a return portion of the overhead methane stream used as the liquid reflux 18. Thereafter, the overhead methane stream 14 is pressurized to about 1,000 psi to 1,400 psi, and then cooled using ambient air and possibly an external propane refrigerant. The pressurized and chilled gas stream is then directed through an expander for further cooling. A turbo expander may be used to recover even more liquid as well as some shaft work. U.S. Pat. No. 6,053,007 entitled "Process For Separating a Multi-Component Gas Stream Containing at Least One Freezable Component," describes the cooling of an overhead methane stream, and is incorporated herein in its entirety by reference.

It is understood here that the present inventions are not limited by the cooling method for the overhead methane stream 14. It is also understood that the degree of cooling between refrigeration unit 170 and the initial refrigeration unit 150 may be varied. In some instances, it may be desirable to operate the refrigeration unit 150 at a higher temperature, but then be more aggressive with cooling the overhead methane stream 14 in the refrigeration unit 170. Again, the present inventions are not limited to these types of design choices.

Returning again to FIG. 1, the liquid reflux 18 is returned into the upper distillation or rectification zone 110. The liquid reflux 18 is then gravitationally carried through one or more mass transfer devices 116 in the upper rectification zone 110. In one embodiment, the mass transfer devices 116 are rectification trays that provide a cascading series of weirs 118 and downcomers 119, similar to trays 126 described above. In lieu of trays, random or structured packing may also be employed.

As fluids from liquid reflux stream 18 move downward through the rectification trays 116, additional methane vaporizes out of the upper rectification zone 110. The methane gases rejoin the overhead methane stream 14 to become part of the gas product stream 16. However, the remaining liquid phase of liquid reflux 18 falls onto a collector tray 140. As it does so, the liquid reflux stream 18 unavoidably will pick up a small percentage of hydrocarbon and residual acid gases moving upward from the controlled freezing zone 108. The liquid mixture of methane and carbon dioxide is collected at a collector tray 140.

Figure 5:
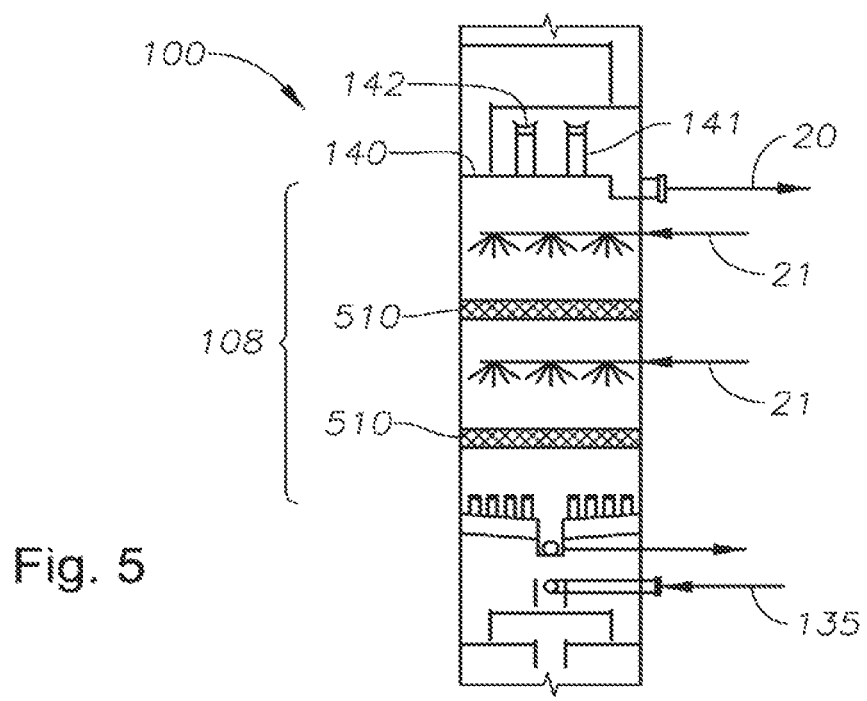
FIG. 5 is a side view of the intermediate controlled freezing zone of the distillation tower of FIG. 1. In this view, two illustrative baffles have been added to the intermediate controlled freeze zone.

The collector tray 140 preferably defines a substantially planar body for collecting liquids. However, as with melt tray 130, collector tray 140 also has one, and preferably a plurality of chimneys for venting gases coming up from the controlled freezing zone 108. A chimney-and-cap arrangement such as that presented by components 131 and 132 in FIGS. 2B and 2C may be used. Chimneys 141 and caps 142 for collector tray 140 are shown in the enlarged view of FIG. 5, discussed further below.

It is noted here that in the upper rectification zone 110, any $H_2S$ present has a preference towards being dissolved in the liquid versus being in the gas at the processing temperature. In this respect, the $H_2S$ has a comparatively low relative volatility. By contacting the remaining vapor with more liquid, the cryogenic distillation tower 100 drives the $H_2S$ concentration down to within the desired parts-per-million (ppm) limit, such as a 10 or even a 4 ppm specification. As fluid moves through the mass transfer devices 116 in the upper rectification zone 110, the $H_2S$ contacts the liquid methane and is pulled out of the vapor phase and becomes a part of the liquid stream 20. From there, the $H_2S$ moves in liquid form downward through the lower distillation zone 106 and ultimately exits the cryogenic distillation tower 100 as part of the liquefied acid gas bottoms stream 22.

In cryogenic distillation tower 100, the liquid captured at collector tray 140 is drawn out of the upper rectification zone 110 as a liquid stream 20. The liquid stream 20 is comprised primarily of methane. In one aspect, the liquid stream 20 is comprised of about 93 mol. percent methane, 3% $CO_2$, 0.5% $H_2S$, and 3.5% $N_2$. At this point, the liquid stream 20 is at about −125° F. to −130° F. This is only slightly warmer than the reflux fluid 18. The liquid stream 20 is directed into a spray header collection drum 174. The purpose of the spray header collection drum 174 is to provide surge capacity for a pump 176. Upon exiting the spray header collection drum 174, a spray stream 21 is created. Spray stream 21 is pressurized in a pump 176 for a second reintroduction into the cryogenic distillation tower 100. In this instance, the spray stream 21 is pumped into the intermediate controlled freezing zone 108 and emitted through nozzles 122.

Some portion of the spray stream 21, particularly the methane, vaporizes and evaporates upon exiting the nozzles 122. From there, the methane rises through the intermediate controlled freezing zone 108, through the chimneys in the collector tray 140, and through the mass transfer devices 116 in the upper rectification zone 110. The methane leaves the distillation tower 100 as the overhead methane stream 14 and ultimately becomes part of the commercial product in gas stream 16.

The spray stream 21 from the nozzles 122 also causes carbon dioxide to desublime from the gas phase. In this respect, some $CO_2$ momentarily enters the gas phase and moves upward with the methane. However, because of the cold temperature within the controlled freezing zone 108, the gaseous carbon dioxide quickly turns into a solid phase and begins to "snow." This phenomenon is referred to as desublimation. In this way, some $CO_2$ never re-enters the liquid phase until it hits the melt tray 130. This carbon dioxide "snows" upon the melt tray 130, and melts into the liquid phase. From there, the $CO_2$-rich liquid cascades down the mass transfer devices or trays 126 in the lower distillation zone 106, along with liquid $CO_2$ from the chilled raw gas stream 12 as described above. At that point, any remaining methane from the spray stream 21 of the nozzles 122 should quickly break out into vapor. These vapors move upwards in the cryogenic distillation tower 100 and re-enter the upper rectification zone 110.

It is desirable to have chilled liquid contacting as much of the gas that is moving up the tower 100 as possible. If vapor bypasses the spray stream 21 emanating from the nozzles 122, higher levels of $CO_2$ could reach the upper rectification zone 110 of the tower 100. To improve the efficiency of gas/liquid contact in the controlled freezing zone 108, a plurality of nozzles 122 having a designed configuration may be employed. Thus, rather than employing a single spray source at one or more levels in a reflux fluid stream 21, several spray headers 120 optionally designed with multiple spray nozzles 122 may be used. Thus, the configuration of the spray nozzles 122 has an impact on the mass transfer taking place within the controlled freezing zone 108.

The assignee herein has previously proposed various nozzle arrangements in co-pending WO Pat. Publ. No. 2008/091316 having an international filing date of Nov. 20, 2007. That application and FIGS. 6A and 6B therein are incorporated herein by reference for teachings of the nozzle configurations. The nozzles seek to ensure 360° coverage within the controlled freezing zone 108 and provide good vapor-liquid contact and heat/mass transfer. This, in turn, more effectively chills any gaseous carbon dioxide moving upward through the cryogenic distillation tower 100.

The use of multiple headers 120 and a corresponding overlapping nozzle 122 arrangement for complete coverage minimizes back-mixing as well. In this respect, complete coverage prevents the fine, low-mass $CO_2$ particles from moving back up the column and entering the upper rectification zone 110. Otherwise, these particles would re-mix with methane and enter the overhead methane stream 14, only to be recycled again.

It can be seen that the process of cycling vapors through the cryogenic distillation tower 100 ultimately produces a gas comprised of a commercial methane product 16. The gas product 16 is sent down a pipeline for sale. The gas product 16 preferably meets a pipeline $CO_2$ specification of 1 to 4 mol. percent, as well as a 4 ppm or less $H_2S$ specification, assuming sufficient reflux is generated. At the same time, acid gases and, if present, heavy hydrocarbons, are removed through bottoms fluid stream 22.

It is observed that an inherent inefficiency exists in freezing the acid gas components into a solid in the controlled freezing zone 108, then melting them into a liquid bottom stream 22 in the lower distillation zone 106, and then separating the $CO_2$ from any entrained natural gases using a bottom reboiler 160. A considerable amount of energy is consumed in connection with freezing the $CO_2$. This energy is at least partially wasted as the solid components in the controlled freezing zone 108 melt and then re-mix in the lower distillation zone 106 with any $H_2S$ and other heavy hydrocarbons in the liquid phase.

Because relatively pure $CO_2$ is more desirable for acid gas injection or disposal, an acid gas enrichment process or other purification method is desired to separate frozen $CO_2$. This separation should take place at the bottom of the controlled freezing zone 108 or at the top of the lower distillation zone 106. Thus, instead of melting the $CO_2$ (and remixing with any liquid $H_2S$ and heavy hydrocarbon components) and gravitationally dropping the liquid-phase components through the lower distillation zone 106, it is proposed herein to replace the melt tray 130 with a collector tray. The collector tray will receive precipitates from the controlled freezing zone 108 in the form of a solid-liquid slurry. The solid-liquids slurry will be collected on the collector tray and removed from the cryogenic distillation tower for separate processing.

FIG. 6A provides a plan view of a collector tray 610, in one embodiment. FIG. 6B provides a cross-sectional view of the collector tray 610, taken across line B-B of FIG. 6A. FIG. 6C shows a cross-sectional view of the collector tray 610, taken across line C-C. The collector tray 610 will be described with reference to these three drawings together.

First, the collector tray 610 includes a base 620. The base 620 may be a substantially planar body, or may have undulations to increase surface area. In either respect, the base 620 is preferably tilted inwardly along opposite sides so that fluids landing on the base 620 will gravitationally drain towards a central downcomer 630.

In the view of FIG. 6C, a sump or "downcomer" 630 is more clearly seen central to the collector tray 130. The collector tray base 620 slopes inwardly towards the downcomer 630 to deliver the solid-liquid slurry. The base 620 may be sloped in any manner to facilitate gravitational solid and liquid draw-off.

As with the melt tray 130 of FIG. 2A, the collector tray 610 of FIGS. 6A, 6B and 6C has a plurality of chimneys 622, 624 (or "risers"). The chimneys 622, 624 provide improved vapor distribution, allowing fluids in the gas phase to travel upward from the lower distillation zone 106 and into the intermediate controlled freezing zone 108. This also contributes to better heat/mass transfer in the controlled freezing zone 108.

The chimneys 622, 624 may be of any profile. For instance, the chimneys 622, 624 may be round, rectangular, or any other shape that allows vapor to pass through the collector tray 610. The chimneys 622, 624 may also be narrow and extend upward into the controlled freezing zone 108. This enables a beneficial pressure drop to distribute the vapor evenly as it rises into the freezing zone 108.

The top openings of the chimneys 622, 624 are preferably covered with hats or caps 626. The caps 626 minimize the chance that solids dropping from the controlled freezing zone 108 will bypass the collector tray 610 and travel into the lower distillation zone 706.

Along with the base 620, the downcomer 630 is preferably inclined. An incline arrangement for a downcomer 630' is demonstrated in the side view of FIG. 6D. FIG. 6D is a cross-sectional view of the collector tray 610 of FIG. 6A, in an alternate embodiment. The view is taken across line B-B of FIG. 6A.

The collector tray 610 is designed to be incorporated into a cryogenic distillation tower as part of a system for removing acid gases from a raw gas stream. The collector tray 610 is configured to receive solid and liquid particles falling from the controlled freezing zone of a cryogenic distillation tower. The collector tray 610 is further configured to transport slurry made up of the solid and liquid particles out of the tower and to a $CO_2$ recovery facility.

Figure 7:
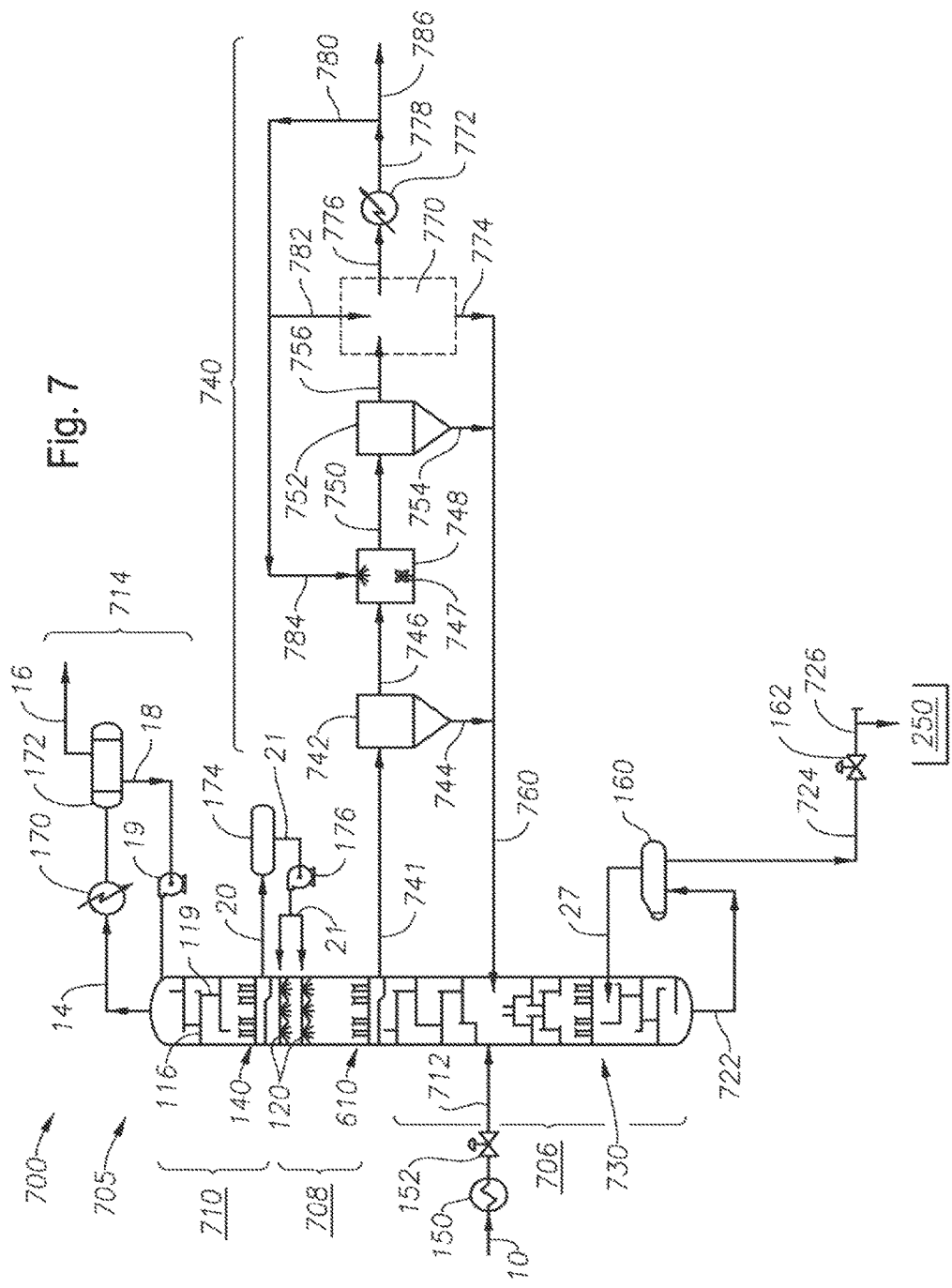
FIG. 7 is a schematic diagram showing a gas processing facility for removing acid gases from a raw gas stream in accordance with the present invention, in one embodiment. The collector tray of FIG. 6A

FIG. 7 is a schematic diagram showing a gas processing facility 700 for removing acid gases from a hydrocarbon gas stream in accordance with the present invention, in one embodiment. The hydrocarbon gas stream originates from hydrocarbon production activities that take place in a reservoir development area, or "field." The field may be any location where compressible hydrocarbons are produced. The field may be onshore, near shore or offshore. The field may be operating from original reservoir pressure or may be undergoing enhanced recovery procedures. The systems and methods claimed herein are not limited to the type of field that is under development so long as it is producing compressible hydrocarbons contaminated with acid gas components.

The gas processing facility 700 utilizes a collector tray such as the collector tray 610 of FIG. 6A. It can be seen in FIG. 7 that the collector tray 610 is incorporated into a cryogenic distillation tower 705. The distillation tower 705 has an intermediate controlled freezing zone 708. The controlled freezing zone 708, or spray section, receives a cold liquid spray comprised primarily of methane.

The cold spray is preferably a liquid reflux generated from an overhead loop 714 downstream of the distillation tower 705. The overhead loop 714 includes refrigeration equipment within a heat exchanger 170 that serves to cool the overhead methane stream 14 and then return a portion of the overhead methane stream 14 to the cryogenic distillation tower 705 as liquid reflux 18. The liquid reflux 18 is sprayed within the controlled freezing zone 708 through spray headers 120 to cause precipitation of solid carbon dioxide particles. As illustrated in FIG. 7, the liquid reflux 18 is delivered to an upper rectification section 710, which will be discussed further below, before being sprayed through the spray headers 120. Other implementations, may draw some or all of the liquid reflux 18 directly to the spray headers 120 or to the spray header collection drum 174.

As with tower 100 of FIG. 1, the cryogenic distillation tower 705 is configured to receive an initial fluid stream 10 comprised of acid gases. The initial fluid stream 10 contains methane, carbon dioxide and, possibly, trace amounts of ethane, nitrogen, helium and hydrogen sulfide. The initial fluid stream 10 preferably undergoes some degree of dehydration before being injected into the distillation tower 705. Dehydration may be accomplished by passing the initial fluid stream through a glycol dehydration process. (A dehydration system is not shown in FIG. 7.)

In addition, the initial fluid stream 10 is preferably chilled before entering the distillation tower 705. A heat exchanger 150, such as a shell-and-tube exchanger, is provided for chilling the initial fluid stream 10. A refrigeration unit (not shown) provides cooling fluid (such as liquid propane) to heat exchanger 150 to bring the temperature of the initial fluid stream 10 down to about −30° F. to −40° F. The initial fluid stream 10 may then be moved through an expansion device 152 such as a Joule-Thompson ("J-T") valve. The result is a chilled raw gas stream 712. Preferably, the temperature of the chilled raw gas stream 712 is around −40° F. to −70° F.

It is noted that in the gas processing facility 700, the raw gas stream 712 is received into the distillation tower 705 below the controlled freezing zone 708. More specifically, the raw gas stream 712 is injected into a lower distillation zone 706 below the controlled freezing zone 708. However, it is understood that the raw gas stream 712 may be directed through a two-phase vessel such as vessel 173 shown in FIG. 1. This generates a split stream comprised primarily of methane vapor (injected into the controlled freezing zone 708) and liquid acid gases and, possibly, heavy hydrocarbons (injected into the lower distillation zone 706.) The two-phase vessel 173 minimizes the possibility of solids plugging the inlet line and internal components of the distillation tower 705.

In one aspect, the cryogenic distillation tower 712 is operated at a pressure of about 550 psi in the controlled freezing zone 708, and the chilled raw gas stream 712 is at approximately −62° F. At these conditions, the raw gas stream 712 is in a substantially liquid phase, although some vapor phase may inevitably be entrained into the chilled gas stream 712. Most likely, no solids formation has arisen from the presence of $CO_2$.

The cryogenic distillation tower 705 also includes an upper rectification zone 710. The upper rectification zone 710 resides above the controlled freezing zone 708. As discussed above in connection with the cryogenic distillation tower 100 of FIG. 1, the distillation zone 710 serves to further separate methane vapor from any entrained carbon dioxide molecules. The distillation zone 710 releases an overhead methane gas stream 14. It also distributes a portion of fluid into liquid stream 20 which is passed through spray header collection drum 174, then to pressure booster 176, and then injected back into the tower 705 through spray headers 120.

As noted, the gas processing facility 700 further comprises a collector tray 610. The collector tray 610 is positioned below the controlled freezing zone 708 for receiving substantially solid material as it is precipitated from the controlled freezing zone 708. It is preferred that the collector tray 610 operate at a temperature of for example, about −70° F. to −80° F. This is at or slightly below the freezing point of the $CO_2$. A slurry is thus generated at the collector tray 610.

Preferably, the collector tray 610 has an inclined base (shown at 620 in FIG. 6C) to direct slurry into a central downcomer (shown at 630 in FIG. 6C). The downcomer 630, in turn, may optionally include a mechanical translation device such as an auger (shown at 640 in FIG. 6B) within the downcomer. The auger 640 serves to mechanically move a slurry that includes the solid $CO_2$ material out of the cryogenic distillation tower 705 and towards a $CO_2$ recovery facility 740.

A slurry exit line 741 is provided in the gas processing facility 700. The slurry exit line 741 moves slurry from the distillation tower 705 to the $CO_2$ recovery facility 740. in this way, carbon dioxide is substantially removed from the distillation tower 705 before it drops into the lower distillation zone 706. The slurry may be moved gravitationally. Alternatively or in addition, the slurry may be translated with the aid of the auger 640. Alternatively still, a portion of the cold liquid reflux 18 may be directed from a side wall of the distillation tower 705 into the collector tray 610 to urge the slurry from the collector tray and out of the distillation tower 705.

There are several potential advantages to extracting $CO_2$ in a solid state without allowing the solid to melt and exit as part of the bottoms fluid stream 722. First, when done at the proper temperature and pressure, the process of crystallizing carbon dioxide into a solid state typically produces a substantially pure solid material. While some trace amounts of methane, hydrogen sulfide and heavy hydrocarbons may be entrained in the solids as part of the slurry, separation of solid $CO_2$ allows for a substantially pure $CO_2$ product. Stripping of light products such as methane or other acid products such as $H_2S$ is not necessarily required as such products will fall as liquids into the bottoms fluid stream 722.

Also, because a substantial portion of the $CO_2$ within the raw gas stream 712 is recovered as a pure solid, the amount of $CO_2$ in the bottoms fluid stream will be reduced. This, in turn, lowers the demands on downstream processes such as acid gas enrichment and sulfur recovery units (not shown). In addition, valuable heavy hydrocarbons such as ethane or propane may be more easily recovered from the bottoms fluid stream 722 as the $CO_2$ content is substantially reduced.

In addition, removing a substantial portion of the $CO_2$ within the raw gas stream 712 as a side-draw (at slurry exit line 741) may reduce the vapor and liquid loads in the distillation tower 705. This, in turn, allows for lower capacities in the reboiler 160 and condenser, that is, the separation chamber 172 and reduced refrigeration requirements. More importantly, extraction of solid $CO_2$ may allow for a smaller diameter tower 705 for an equivalent feed capacity. The size reduction is generally proportional to the amount of solid $CO_2$ extracted from the tower 705.

Referring again to FIG. 7, the carbon dioxide-based slurry is transported through the slurry exit line 741 to the $CO_2$ recovery facility 740. The $CO_2$ recovery facility 740 includes a first filter 742. Preferably, the first filter 742 represents a porous media that catches a substantial portion of the solid material from the slurry. The first filter 742 may be, for example, wire mesh. Alternatively, the filter 742 may be a polyester or other synthetic porous material. The filter 742 may alternatively be a centrifugal separator, a hydrocyclone, one or more belt filters, one or more filter presses, or combinations thereof.

The liquid portion of the slurry is known as a "filtrate." The filtrate passes through the first filter 742 and is delivered to a liquid line 744. The filtrate comprises primarily $CH_4$, but may also include $CO_2$ and $H_2S$. The liquid line 744 delivers the filtrate to a liquid return line 760. The liquid return line 760 returns the filtrate to the lower distillation zone 706 of the cryogenic distillation tower 705. The $CH_4$ is vaporized and becomes part of the overhead methane stream 14. The $H_2S$ and any heavy hydrocarbon components are dropped out of the tower 705 as liquids in the bottoms fluid stream 722.

It is noted that the liquid line 744 may also contain heavy hydrocarbons, particularly measurable components of ethane and propane. These components may be recovered by sending the filtrate 744 through a process similar to a conventional natural gas liquids ("NGL") train (not shown).

The first filter 742 captures the solid portion of the slurry, known as a "filter cake." The filter cake comprises primarily carbon dioxide. The solid filter cake is delivered along a first solid material line 746. The filter cake may be carried from the first filter 742 through the first solid material line 746 by means of a screw-conveyor, by Hildebrandt extractors, or by other means known in the art.

From there, the filter cake may be warmed so that it enters the liquid phase. In one aspect, the solid carbon dioxide from first solid material line 746 is warmed in a heat exchanger 772. The heat exchanger 772 may, for example, use heat from the initial fluid stream 10 for melting the carbon dioxide. This beneficially cools the initial fluid stream 10 before it enters the heat exchanger 150. At the same time, the warmed liquid $CO_2$ is delivered as substantially pure carbon dioxide liquid through $CO_2$ fluid line 786.

In lieu of delivering the frozen carbon dioxide (or filter cake) in solid material line 746 directly to a heat exchanger 772, the operator may choose to carry the frozen carbon dioxide through additional filtering. In the gas processing facility 700, the $CO_2$ recovery facility 740 may include a rinsing vessel 748. In the rinsing vessel 748, cold liquid $CO_2$ is sprayed onto the frozen carbon dioxide. This has the effect of creating a new slurry, with any residual methane and hydrogen sulfide being rinsed away from the solid filter cake as a liquid.

The cold carbon dioxide used as the rinsing agent is delivered through $CO_2$ delivery line 784. The cold $CO_2$ used as the rinsing agent is preferably drawn from an outlet 778 for the heat exchanger 772. A cold $CO_2$ line is shown at 780.

Referring again to the rinsing vessel 748, preferably, the slurry is mixed in the rinsing vessel 748. A stirring apparatus 747 may be provided in the rinsing vessel 748. The stirring apparatus 747 may be, for example, a set of blades that rotate through the solid material to create surface area. Creating surface area exposes the solid material to the cold liquid $CO_2$ from deliver line 784. This, in turn, helps to rinse the residual methane and hydrogen sulfide from the solid.

The new slurry is carried from the rinsing vessel 748 through slurry line 750. The new slurry is delivered to a second filter, noted in FIG. 7 as 752. The second filter 752 captures the solid portion of the new slurry. The solid portion again comprises primarily carbon dioxide. The solid portion represents a second filter cake, and is delivered along a second solid material line 756. From there, the second filter cake may be warmed so that it enters the liquid phase.

It is noted that the rinsing and filtration steps are shown taking place in separate vessels, e.g., a rinsing vessel 748 and a filtration vessel 752. However, the operator may choose to combine the rinsing and filtration of solid material in a single vessel.

The liquid portion of the new slurry, known as a second filtrate, passes through the second filter 752 and is delivered to a liquid line 754. The second filtrate comprises $CH_4$ and, possibly, $H_2S$ and heavy hydrocarbons. The liquid line 754 delivers the liquid portion of the slurry to the liquid return line 760. Thus, the liquid representing the second filtrate 754 merges with the liquid representing the first filtrate 754 before being injected into the distillation tower 705 through liquid return line 760. The $CH_4$ is vaporized and becomes part of the overhead methane stream 14. The $H_2S$ and $C_2+$ compounds are dropped out of the tower 705 as liquids in the bottoms fluid stream 722. Should either the first filtrate 744 or the second filtrate 754 contain any melted $CO_2$, the melted $CO_2$ will evaporate into the controlled freezing zone 708 and ultimately precipitate back onto the collector tray 610 as frozen material.

Optionally, the first 744 and/or second 754 filtrate may be carried through the liquid return line 760 to a small, peripheral distillation column (not shown) for further purification.

The operator may choose to carry the substantially pure, solid $CO_2$ in line 756 directly to the heat exchanger 772. Alternatively, additional separation of impurities may take place. Box 770 in FIG. 7 depicts one or more additional rinsing and filtration stages for the solid $CO_2$ in line 756. The number of rinse and filtration steps is dependent on the desired purity of the $CO_2$ product. Line 782 is shown delivering cold $CO_2$ as a rinsing agent. A third (or subsequent) filtrate 774 is released from the additional rinsing and filtration stage 770. A third (or subsequent) solid $CO_2$ (or filter cake) is delivered through line 776 to the heat exchanger 772. A final $CO_2$ product line is seen at line 786. The liquid $CO_2$ product may be used for acid gas injection, or may be delivered for sale as a high-purity product. A customer may, for example, use the liquid $CO_2$ product for enhanced oil recovery or for other purposes.

The gas processing facility 700 of FIG. 7 is ideally used in conditions where the chilled raw gas stream 712 has a high $CO_2$ content, such as greater than approximately 30%. In this condition, significant refrigeration may be required to freeze all $CO_2$ from the raw gas stream 712. Therefore, it is believed to be more energy efficient to inject the raw gas stream 712 in the lower distillation zone 706 below the controlled freezing zone 808 and below the collector tray 610. Any $CO_2$ that stays in liquid form and drops out of the distillation tower 705 with the bottoms feed stream 722 will be recovered through the reboiler 160 and re-injected into the lower distillation zone 706.

In the illustrative gas processing system 700, the collector tray 610 and corresponding slurry exit line 741 are positioned well above the raw gas injection point. The operator may choose to raise the point at which the raw gas stream 12 enters the cryogenic distillation tower 705. It is believed that raising the injection point will increase the amount of fluid from the raw gas stream 712 that is recovered on the collector tray 610 as solid. This is more advantageous where the raw gas stream 712 has a lower $CO_2$ content, such as about 10 to 30 mol. percent.

In one simulation conducted by the Applicant, the collector tray 610 and corresponding slurry exit line 741 were positioned at or slightly above the raw gas injection point. The raw gas stream 712 was simulated to have a composition of 70 mol. percent $CO_2$ and 30 mol. percent $CH_4$. An initial gas temperature of 40° C. was assumed, with an injection flow rate of approximately 10,000 standard $m^3$/hour. The cryogenic distillation tower 705 was simulated to operate at 450 psia.

In this simulation, approximately 93% of the feed $CO_2$ exited the cryogenic distillation tower as a solid. Very little fluid was left to travel down the distillation tower in liquid form. This, of course, produced a substantial reduction in volume for the bottoms fluid stream 722 and reduced the load requirements for the reboiler 160 by about 89%. The drawback to this approach is that more refrigeration is required in the heat exchanger 150 upstream of the distillation tower 705 to chill the initial fluid stream 10. This is partially offset by a slight reduction in refrigeration required in the heat exchanger 170 downstream of the distillation tower 705.

Figure 8:
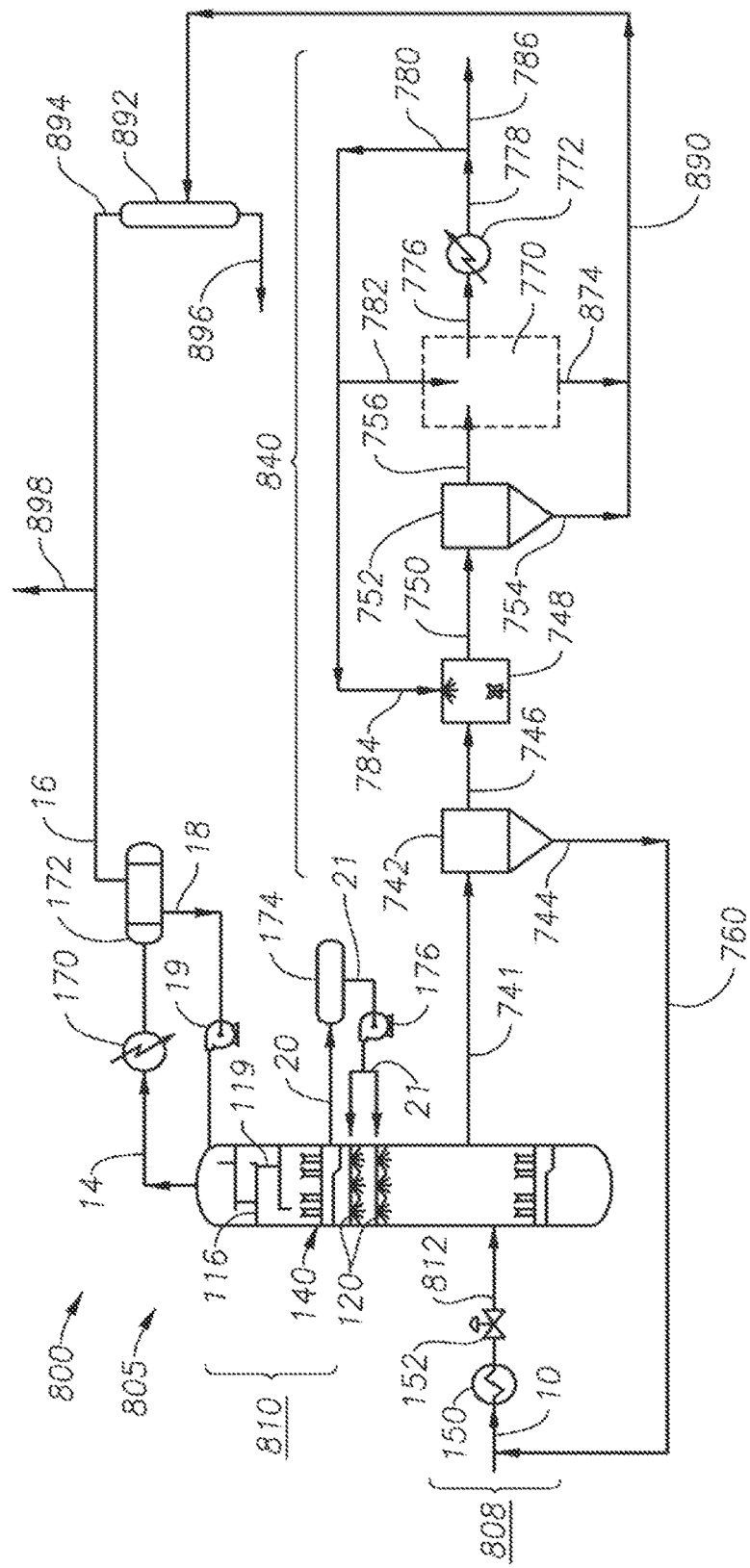
FIG. 8 is a schematic diagram showing a gas processing facility for removing acid gases from a gas stream in accordance with the present invention, in an alternate embodiment. The collector tray of FIG. 6A

FIG. 8 is a schematic diagram showing a gas processing facility 800 for removing acid gases from a gas stream in accordance with the present invention, in an alternate embodiment. The gas processing facility 800 is generally similar to the gas processing facility 700. In this respect, the gas processing facility 800 also utilizes a collector tray such as the collector tray 610 of FIG. 6 A. The collector tray 610 is incorporated into a cryogenic distillation tower 805. The distillation tower 805 again has an intermediate controlled freezing zone 808. The controlled freezing zone 808, or spray section, receives a cold liquid spray comprised primarily of methane.

As with tower 705 of FIG. 1, the cryogenic distillation tower 805 is configured to receive an initial fluid stream 10 comprised of hydrocarbon and acid gases. The initial fluid stream 10 preferably undergoes some degree of dehydration before being injected into the distillation tower 805. In addition, the initial fluid stream 10 is preferably chilled before entering the distillation tower 805. A heat exchanger 150, such as a shell-and-tube exchanger, is provided for chilling the initial fluid stream 10. A refrigeration unit (not shown) provides cooling fluid (such as liquid propane) within the heat exchanger 150 to bring the temperature of the initial fluid stream 10 down to about −60° F. to −80° F. The initial fluid stream 10 may then be moved through an expansion device 152 such as a Joule-Thompson ("J-T") valve. The result is a chilled raw gas stream 812.

As noted above, in the gas processing facility 700, the raw gas stream 712 is received below the controlled freezing zone 708. More specifically, the raw gas stream 712 is injected into the lower distillation zone 706. However, in the cryogenic distillation tower 805, the distillation zone (706 from FIG. 7) has been removed, and the collector tray 610 now resides in the controlled freezing zone 808. In addition, the raw gas stream 812 is injected into the controlled freezing zone 808 above the collector tray 610. This is consistent with the simulation described above.

The purpose for moving the injection point for the chilled raw gas stream 812 up into the controlled freezing zone 808 is to obtain a higher solid $CO_2$ recovery. To effectuate this, the temperature of the chilled raw gas stream 812 is brought down to around −60° F. to −80° F. This is a lower temperature range than was imposed on the raw gas stream 712 in FIG. 7. As the raw gas stream 812 enters the tower 805, it flashes and cools, precipitating the $CO_2$ in the controlled freezing zone 808. Any vapor $CO_2$ will be cooled by the liquid $CH_4$ reflux descending from the spray headers 120. his produces a solid that precipitates onto the collector tray 610, forming a slurry.

As with gas processing facility 700, the slurry is moved in gas processing facility 800 from the cryogenic distillation tower 805, through a slurry exit line 741, and to a $CO_2$ recovery system 840. The $CO_2$ recovery system 840 may be the same as the $CO_2$ recovery system 740 of FIG. 7. In this respect, a slurry comprised primarily of carbon dioxide is moved through a first filter 742, and then optionally moved through one, two, or three stages of rinsing and filtration until a substantially pure $CO_2$ solid is obtained. The $CO_2$ solid is preferably warmed through the heat exchanger 772 and then released through outlet 778 as a liquid. Liquid $CO_2$ is released as a product through line 786.

In the $CO_2$ recovery system 840 of FIG. 8, the first filtrate 744 from first filter 742 is returned to the cryogenic distillation tower 805. This is consistent with the operation of the $CO_2$ recovery system 740 of FIG. 7. However, instead of returning the methane-rich first filtrate 744 through the liquid return line 760 and directly into the tower 805, the first filtrate 744 is merged with the initial fluid stream 10. In this way, the methane-rich first filtrate 744 may be re-chilled before injection into the controlled freezing zone 808.

In the $CO_2$ recovery system 840, the second filtrate 754 and subsequent filtrate(s) 874 are not merged with the liquid return line 760; rather, the second filtrate 754 and the subsequent filtrate(s) 874 are merged together and delivered to a downstream distillation column 892. The second filtrate 754 and the subsequent filtrate(s) 874 are comprised primarily of hydrogen sulfide, but may contain trace amounts of methane and carbon dioxide. In the reboiler 892, the methane is released as a recovery methane stream 894. The recovery methane stream 894 is merged with the methane sales product 16 and delivered to market as sales product 898.

The reboiler 892 also releases a liquid 896. The liquid 896 comprises primarily hydrogen sulfide with trace amounts of carbon dioxide. The $H_2S$-rich liquid 896 is disposed of or taken through a sulfur recovery unit (not shown). As an alternative, the second filtrate 754 and the subsequent filtrate(s) 874 may be disposed of or taken through a sulfur recovery unit without going through the reboiler 892. This is particularly applicable if the amount of $CH_4$ content does not warrant recovery, or require separation.

As can be seen from FIGS. 7 and 8, different processing schemes may be utilized. The optimum arrangement will depend on a number of variables. These variable include the availability (or capacity) of refrigeration as generated within an overhead heat exchanger such as heat exchanger 170, the desired purity of the $CO_2$ product 786 and, most importantly, the composition of the initial fluid stream 10. Regardless of the selected flow scheme, the basic principle of distillation combined with solid removal and purification will apply.

In some situations, the initial fluid stream 10 may have a high concentration of hydrogen sulfide, such as greater than about 5 to 10 percent. It some implementations, such as when solid $CO_2$ recovery is desired, it may be undesirable to run a gas feed stream having a high $H_2S$ concentration through a cryogenic distillation tower as it is believed that high levels of $H_2S$ can solubilize $CO_2$, thereby preventing solid formation in the controlled freezing zone. In this situation, natural gases with a high ratio of $H_2S$ to $CO_2$ may be fed to a. pre-treating column (not shown) for selective $H_2S$ removal prior to being introduced to the main distillation tower 705 or 805. The separation can be achieved using $H_2S$ separation processes such as absorption by selective amines, redox processes, or adsorption. Thereafter, the gas stream may be dehydrated and refrigerated in accordance with the illustrative processing facilities 700 or 800 described above. Additionally or alternatively, other implementations may be insensitive to the state of the $CO_2$ recovery product and the $H_2S$ may be left in the initial fluid stream.

An additional advantage to the removal of sulfur species upstream of the distillation tower is that sulfur removal may enable the production of a higher purity $CO_2$ product 786 from the recovery system 740 or 840. In addition, a higher purity of $C_2$+ products may be recovered from the bottoms fluid stream 722. Of course, small amounts of $H_2S$ can be allowed to slip into the cryogenic distillation tower 705, 805, provided the phase behavior within the tower 705, 805 allows solid $CO_2$ formation. Such small amounts of $H_2S$ will be recovered in the bottoms fluid stream 22.

A method of removing acid gases from a raw gas stream is also provided herein. FIG. 9 is a flow chart that presents a method 900 for removing acid gases from a raw gas stream using an acid gas removal system in accordance with the present inventions, in one embodiment. The raw gas stream comprises methane, carbon dioxide and, most likely, other components such as ethane and hydrogen sulfide.

The method 900 first includes providing a cryogenic distillation tower. This step is shown at Box 905. The tower has a controlled freezing zone that receives a cold liquid spray comprised primarily of methane. The tower further has a collector tray below the controlled freezing zone.

The method 900 also includes injecting the raw gas stream into the cryogenic distillation tower. This is demonstrated at Box 910. In one arrangement, the raw gas stream is injected into the distillation tower in a lower distillation zone below the controlled freezing zone. In another arrangement, the raw gas stream is injected into the distillation tower in the controlled freezing zone itself. Preferably, the raw gas stream has been substantially dehydrated before it is injected into the distillation tower.

The method 900 further includes chilling the raw gas stream. This is indicated at Box 915 of FIG. 9. Chilling the raw gas stream causes carbon dioxide within the raw gas stream to precipitate upon the collector tray as substantially solid material. At the same time, the pressure in the distillation tower is lower than a feed stream, causing methane within the raw gas stream to substantially vaporize. The methane travels through an upper rectification zone above the controlled freezing zone, and then exits the cryogenic distillation tower as an overhead methane stream.

The method 900 also includes passing the overhead methane stream through a refrigeration system downstream of the cryogenic distillation tower. This is provided in Box 920. The refrigeration system cools at least a portion of the overhead methane stream to a liquid.

The method 900 additionally includes returning a portion of the cooled overhead methane stream to the cryogenic distillation tower as liquid reflux. The liquid reflux, in turn, serves as the cold liquid spray. This is provided at Box 925.

Also as part of method 900, the solid material is substantially removed from the cryogenic distillation tower. This is shown at Box 930. Preferably, removal of the substantially solid material is accomplished through gravitational flow. Alternatively, a mechanical translation device such as a screw conveyor or auger may be provided. The auger may reside within a downcomer of the collector tray as demonstrated in FIGS. 6A, 6B, 6C and 6D. The auger may alternatively be placed outside of the distillation tower to direct the substantially solid material to the $CO_2$ recovery system, in either instance, the auger cuts through the substantially solid material, translating it as a slurry out of the distillation tower and towards a $CO_2$ recovery system.

The method 900 further includes separating the carbon dioxide slurry into a solid material and a liquid material. This is shown at Box 935. The first solid material is comprised primarily of carbon dioxide, while the liquid material comprises methane and residual carbon dioxide. The liquid material may include other components such as hydrogen sulfide, heavy hydrocarbons and even light aromatics.

The separating step of Box 935 may be accomplished by passing the slurry through a first filter. This produces a first filter cake comprised primarily of solid carbon dioxide, and a first filtrate comprising methane and carbon dioxide, in liquid phase. The first filter may be, for example, a porous media or a centrifuge.

The separating step of Box 935 may further comprise rinsing the first filter cake using a cold carbon dioxide stream, mixing the first filter cake to produce a first solid-liquid slurry, and delivering the first solid-liquid slurry to a second filter. The second filter produces a second filter cake comprised primarily of solid carbon dioxide, and a second filtrate comprising primarily methane but also carbon dioxide and hydrogen sulfide, again in liquid phase.

Additional CO₂ removal may be undertaken. For example, the separating step of Box 935 may further comprise rinsing the second filter cake using the cold carbon dioxide stream, mixing the second filter cake to produce a solid-liquids slurry, and delivering the solids-liquid slurry to yet a third filter. This produces a third filter cake comprised primarily of solid carbon dioxide, and a third filtrate comprising methane, hydrogen sulfide, and carbon dioxide, again in liquid phase.

The method 900 also includes returning at least a portion of the second liquid material to the cryogenic distillation tower. This is shown at Box 940. In one aspect, the second liquid material is directed back to the lower distillation zone. In another aspect, the second liquid material is merged with the raw gas stream and is injected into the tower in the controlled freezing zone.

In one embodiment of the method 900, the first filtrate and the second filtrate are combined. The combined fluid from the filtrates forms the liquid material that is returned to the cryogenic distillation tower. In this instance, the liquid material is preferably injected into the lower distillation zone.

In another embodiment of the method 900, only the first filtrate is returned to the distillation tower. In this instance, the first filtrate may be returned back to the controlled freezing zone. The distillation tower preferably will not have a lower distillation zone; instead, the second and, optionally, third filtrates are delivered to a separate, downstream distillation tower where residual acid gases are finally separated from methane. In this instance, a recovery methane stream is obtained that is merged with the overhead methane stream of the cryogenic distillation tower for sale.

In yet another arrangement of the method 900, the final filter cake is warmed. This is done regardless of whether there are one, two, three or more filtration stages. The final filter cake is a final-stage filter cake taken from the final filter, whatever that may be. This will, of course, include at least a portion of the first solid material. This warming step is shown in Box 945 of FIG. 9.

Warming may be done, for example, by heat exchanging the solid carbon dioxide making up the filter cake with the raw gas stream. The result is a cold, pure carbon dioxide liquid. The pure carbon dioxide may be sold on the market or used for enhanced oil recovery operations. In addition, a portion of the cold carbon dioxide stream may be used as a rinse for creating the solid-liquid slurry as described above.

While it will be apparent that the inventions herein described are well calculated to achieve the benefits and advantages set forth above, it will be appreciated that the inventions are susceptible to modification, variation and change without departing from the spirit thereof. Improvements to the operation of an acid gas removal process using a controlled freezing zone are provided. The improvements provide a design for the removal of CO₂ down to very low levels in the product gas. The inventions herein may also reduce the refrigeration requirements of cryogenic distillation towers while meeting LNG specifications for maximum allowable CO₂.

What is claimed is:

1. A method for removing acid gases from a dehydrated raw gas stream, comprising:
   providing a cryogenic distillation tower, the tower having a controlled freezing zone that receives a cold liquid spray comprised primarily of methane, and a collector tray below the controlled freezing zone;
   injecting the raw gas stream into the cryogenic distillation tower;
   chilling the raw gas stream so as to cause carbon dioxide within the raw gas stream to precipitate upon the collector tray as a slurry, while allowing methane to vaporize and exit the cryogenic distillation tower as an overhead methane stream;
   passing the overhead methane stream through a refrigeration system downstream of the cryogenic distillation tower, the refrigeration system cooling the overhead methane stream;
   returning a portion of the cooled overhead methane stream to the cryogenic distillation tower as liquid reflux to serve as the cold liquid spray;
   removing the slurry from the cryogenic distillation tower;
   separating the slurry into a solid material comprised primarily of carbon dioxide, and a liquid material comprising methane, said separating step comprising passing the slurry through a first filter, thereby producing a first filter cake comprising the solid material, and a first filtrate comprising the liquid material, and wherein the first filtrate further comprises methane and carbon dioxide, in liquid phase;
   warming solid material taken primarily from the first filter cake to produce a carbon dioxide stream, in liquid phase, wherein the liquid carbon dioxide stream comprises a portion of the carbon dioxide stream; and
   returning at least a portion of the liquid material to the cryogenic distillation tower.

2. The method of claim 1, wherein:
   the collector tray comprises a downcomer into which the precipitated slurry falls; and
   the collector tray directs the slurry out of the cryogenic distillation tower (i) by gravitational flow, (ii) by operation of a mechanical translation device, (iii) by aid of spraying a portion of the cold liquid spray into the collector tray and against the slurry, or (iv) by combinations thereof.

3. The method of claim 1, wherein:
   the cryogenic distillation tower further comprises an upper rectification zone above the controlled freezing zone, and a lower distillation zone below the controlled freezing zone; and
   the raw gas stream is injected into the lower distillation zone;
   and further comprising releasing a bottoms stream from the lower distillation zone, the bottoms stream comprising acid gases in liquid phase; and
   wherein returning at least a portion of the liquid material to the cryogenic distillation tower comprises delivering the liquid material to the lower distillation zone.

4. The method of claim 1, wherein said separating step further comprises:
   rinsing the first filter cake using a liquid carbon dioxide stream;
   mixing the first filter cake with the liquid carbon dioxide stream to produce a first solid-liquid slurry; and
   delivering the first solid-liquid slurry to a second filter, thereby producing a second filter cake comprised primarily of solid carbon dioxide, and a second filtrate comprising methane, in liquid phase.

5. The method of claim 4,
   further comprising combining the first filtrate and the second filtrate; and
   wherein the liquid material that is returned to the lower distillation zone comprises the combined first filtrate and second filtrate.

6. The method of claim 5, further comprising:
rinsing the second filter cake using the liquid carbon dioxide stream;
mixing the second filter cake to produce a solid-liquid slurry; and
delivering the solid-liquid slurry to a third filter, thereby producing a third filter cake comprised primarily of solid carbon dioxide, and a third filtrate comprising methane, in liquid phase.

7. The method of claim 1, wherein the warming comprises passing slurry taken from the first filter cake through a heat exchanger such that heat is exchanged with the raw gas stream.

8. The method of claim 1, wherein the first filter comprises a porous medium or a centrifuge.

9. The method of claim 1, wherein the step of returning at least a portion of the liquid material to the cryogenic distillation tower comprises injecting the first filtrate directly back into the controlled freezing zone.

10. The method of claim 6, further comprising:
combining the second filtrate and the third filtrate;
injecting the second filtrate and the third filtrate into a distillation separator, thereby producing a bottoms liquid stream comprised primarily of carbon dioxide, in liquid phase, and a recovery methane stream; and
combining the overhead methane stream from the cryogenic distillation tower with the recovery methane stream.

11. The method of claim 2, wherein the collector tray is inclined towards the downcomer to direct the slurry into the downcomer.

* * * * *